United States Patent [19]

Takahashi

[11] Patent Number: 5,375,141
[45] Date of Patent: Dec. 20, 1994

[54] SYNCHRONIZING CIRCUIT IN A SPREAD SPECTRUM COMMUNICATIONS SYSTEM

[75] Inventor: Satoshi Takahashi, Yokohama, Japan
[73] Assignee: Ricoh Company, Ltd., Tokyo, Japan
[21] Appl. No.: 77,691
[22] Filed: Jun. 17, 1993

[30] Foreign Application Priority Data

Jun. 17, 1992 [JP] Japan ................................ 4-183255
Oct. 28, 1992 [JP] Japan ................................ 4-312751

[51] Int. Cl.$^5$ ............................................. H04L 9/00
[52] U.S. Cl. ......................................................... 375/1
[58] Field of Search ............................... 375/1; 380/9

[56] References Cited

U.S. PATENT DOCUMENTS

| | | | |
|---|---|---|---|
| 3,864,635 | 2/1975 | Ewanus | 375/1 |
| 4,435,822 | 3/1984 | Spencer et al. | 375/1 |
| 4,538,280 | 8/1985 | Mosley, Jr. et al. | 375/1 |
| 4,864,589 | 9/1989 | Endo | 375/1 |
| 4,918,707 | 4/1990 | Yoshihara | 375/1 |
| 5,062,122 | 10/1991 | Pham et al. | 375/1 |
| 5,216,693 | 6/1993 | Nakamura | 375/1 |
| 5,216,714 | 6/1993 | Speiser | 380/9 |
| 5,258,995 | 11/1993 | Su et al. | 375/1 |

*Primary Examiner*—Salvatore Cangialosi
*Attorney, Agent, or Firm*—Oblon, Spivak, McClelland, Maier & Neustadt

[57] ABSTRACT

By taking the product of two correlators, the present invention realizes a synchronizing method having good tracking characteristics and not requiring balance between pairs of correlator signals in a receive system for a spread spectrum communications system for a carrier band. A correlator 1 correlates the received signals and the PN signals from a PN signal generator 6 and a correlator 2 correlates the received signals, PN signals from a PN signal generator 6, and clock signals from a VCC 5. The signals of the correlator 1 and the signals of the correlator 2 are multiplied by a multiplier 3, and are passed through a low pass filter 4 so as to obtain and control signals for clock control of PN signals.

17 Claims, 28 Drawing Sheets

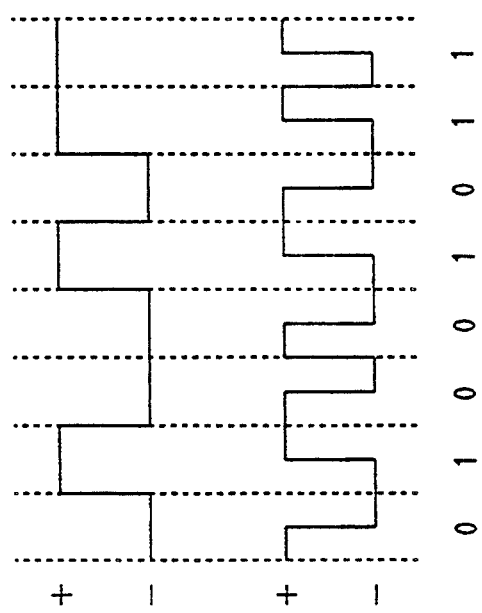
FIG. 2 (A) NRZ CODE
FIG. 2 (B) MANCHESTER CODE

F I G. 22
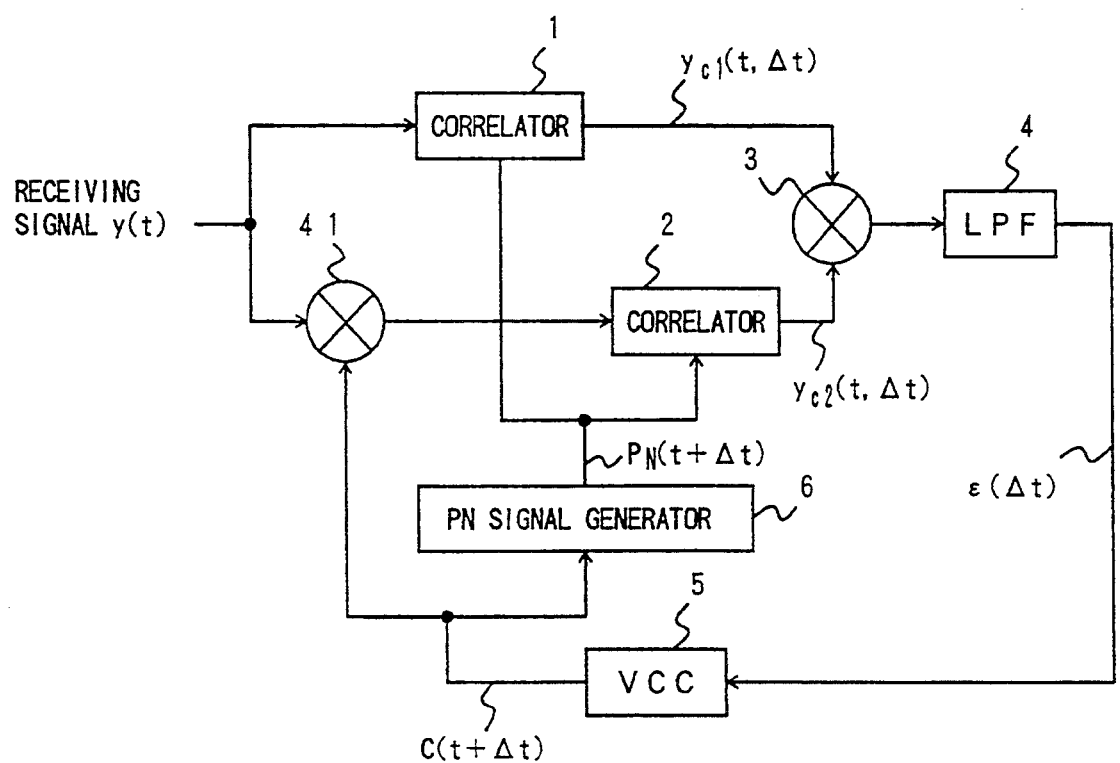

SYNCHRONIZING CIRCUIT IN A SPREAD SPECTRUM COMMUNICATIONS SYSTEM

BACKGROUND OF THE INVENTION

The present invention relates to spread spectrum communications systems and in particular, to the pseudo-noise signal (PN signal hereinafter) synchronizing method, the gain control method and the synchronizing judgement method, and is, for example, suited to application to optical communications, radio communications and power-line carriers.

The known literature, which discloses the conventional technology relating to the present invention, includes "Spread Spectrum Communications Systems" (H. Yokoyama, Scientific Technology Press (KAGAKUGIJUTSU SHUPPAN-SHA); 1988, pp. 300–304).

In a conventional spread spectrum communications system, it is necessary to have phase synchronization on the receiving side between the reverse spread code and the received signals. A synchronization circuit using a non-coherent delay locked loop (DLL) is used to achieve phase synchronization. This synchronizing circuit uses a PN generator inside the DLL to obtain a phase differential signal for sync control from the correlations (first correlation) between the received signal and the PN signal that are several cycles faster than the timing of a clock signal and from the correlation (second correlation) between the receive signal and the PN signal that are several cycles slower than the timing of a clock signal. However, such a DLL has a problem in that there is an adverse influence exerted on the tracking characteristic thereof when the balance between the gains of the two correlators is upset.

FIG. 1 is a view of a configuration of a non-coherent delay locked loop (DLL), and illustrates the case for a 1 Δ-DLL which uses a pN (pseudo noise) signal displaced 1 cycle from the synchronizing loop.

In this figure, the DLL is comprised of the PN signal generator (pseudo-noise generation unit) 61, the VCC (voltage control clock generator) 62, the OSC (local oscillator) 63, the multipliers 64–67, the BPF (band pass filters) 68, 69, the correlators 70, 71, the envelope detectors 72, 73, and the adder 74.

The PN signal generator 61 is driven by the timing of the control clock 62 and generates PN signals. Here, when signals are generated a ½ cycle faster PN signal (called "nearly signal" hereinafter) and PN signals ½ cycle slower (called "late signal" hereinafter) are taken from the PN signal generator 61. In FIG. 1, "a" shows the early signal and "b" shows the late signals.

The multipliers 64, 65 respectively multiply the early signals "a" and the late signals "b" with the local oscillator signals generated by the local oscillator 63, and place them on the carrier band. The multiplier 67 multiplies the early signal which has been placed on the carrier band and the received signal, and these signals are filtered by the band-pass filter 69 so that only the intermediate frequency components thereof remain. At this time, a simultaneous correlation is achieved between the intermediate-frequency element and the PN signal of the received signal y(t). In the same manner, the late signals are multiplied by the multiplier 66 and filtered by the band-pass filter 68 so that only the intermediate-frequency components remain, and correlation between the intermediate frequency component and the PN signals is achieved. Futhermore, the output of the correlators 70, 71 is taken in the envelope detectors 73 and 72 as the amplitude of the correlators. The adder 74 obtains a difference signal between these two signals. The difference signal is fed back as the control signal for the control clock 62.

In addition, in the prior art Japanese Patent Laid Open Application No. 92-57174 "Synchronizing Method for PN signals in a Base band" the fact that the correlation value between PN signal of the Manchester code and a NRZ (Non Return to Zero) code has an S-shaped characteristic curve is used, and this characteristic is used in controlling the control clock. When this is done, the information signals cause the correlation value to have positive and negative values thereof reversed, and so the correlation value of the NRZ code pairs are multiplied with this correlation value so that the phase difference of the PN signals are always decreased. Moreover, as shown in FIG. 2 (A), the NRZ code is a code which has logical code value 0 corresponding to a negative voltage and logical code value 1 corresponding to a positive voltage. In addition and as shown in FIG. 2 (B), a Manchester code is a code which has logical code value 0 corresponding to the status where there is change from positive to negative, and logical code value 1 corresponding to the status where there is change from negative to positive.

In addition, there has also been proposed a "Spread Spectrum Receiver" in Japanese Patent Laid Open Application No.91-235541. This publication relates to a gain control method in spread spectrum communications.

Spread spectrum communications frequently have a C/N (carrier to noise) ratio of less than one due to that communications are performed in a status where the carrier-frequency level is smaller than the noise level. Therefore,it is not only necessary to apply AGC (Auto Gain Control) for the level of the received signals, as in the case of normal radio communications, but also it is necessary to apply AGC for the level of signals which are the reverse spread of the received signals.

In Japanese Laid Open Patent Application No. 92-35239 there is disclosed a "Synchronizing Establishment Judgement Circuit". The circuit of this publication relates to a synchronizing judgement method in pseudo-noise signal synchronization.

The synchronization circuit for the PN signals used in spread spectrum communications exhibits only a tracking characteristic with respect to phase errors of ±½ cycle or ± some several cycle portions of PN signals, and it is not possible to establish synchronization with respect to phase errors larger than this. Accordingly, when initial synchronizing is performed or when there is a synchronization step-out, it is necessary to detect that there is a step out of synchronization, and to slide the PN signal until tracking by the synchronizing circuit becomes possible. A synchronous judgement circuit is used to detect that there is a synchronization step-out.

Spread spectrum communications using the conventional direct sequence (DS) method obtain synchronization of the PN signal mainly by using a DLL such as shown in FIG. 1. However, a conventional DLL obtains the difference of the two correlators 70, 71, so there is a disadvantage in that the synchronizing tracking characteristic deteriorates if the balance of the gains of the correlators 70, 71 is upset.

In addition, a DLL performs synchronizing in the state where the phase of the PN signal has slipped by only ½ cycle, and so reverse spread is achieved by separately taking from the synchronizing loop those PN signals of the same phase as the received signals and then reverse spreading the received signals again. Then, the DLL performs AGC control by detection of the level of these reverse spread signals, and subsequently performs synchronizing judgment.

Furthermore, a method for performing AGC and synchronizing judgment by referring to the level of a conventional reverse spread signal has an extremely sharp correlation characteristic curve for the PN signal, as can be seen in FIG. 3 (A), and so, jitter of the phase of the PN signals causes the level of the reverse spread signal to fluctuate largely, thus resulting in a disadvantage in that deterioration of the AGC and synchronizing judgement characteristics occurs.

Furthermore, in "A Modified PN Code Tracking Loop" (R. A. Yost, R. W. Boyd, IEEE Transactions on Aerospace and Electronic Systems. 1980), there is disclosed a PN signal synchronizing loop which multiplies together PN signals of the same phase (called "on-time" signals hereinafter), a correlation value for the received signals, and one other correlation value.

However, "A Modified PN Code Tracking Loop" does not disclose a "one other correlation value" which results from multiplying the received signal and the difference signal between the early signal and the late signal, and the correlation signal between the received signal, the PN signal and clock signal.

Furthermore, the optimum bandwidth of a band spectrum of a correlator such as a DLL synchronizing loop, a Tau dither loop and a MCL (Modified Code Loop) for PN signals is disclosed in "Non-coherent pseudo-noise code tracking loop of Spread Spectrum Receiver"(M. K. Simon, IEEE Trans. Communication. vol. COM-25, No.3, pp. 327-345, March, 1977) and "A Modified PN Code Tracking Loop; Its performance analysis and comparative evaluation" (R. A. Yost and R. W. Bond, IEEE Trans. Communication. vol. COM-30, No.5, pp. 1027-1036, May, 1982). However, the values determined in this literature are optimum values which relate only to these three loops and there is no mention of the present invention's optimum width for a band pass filter for a PN synchronizing loop.

SUMMARY OF THE INVENTION

Accordingly, an object of the present invention is to provide a novel and effective spread spectrum communications system wherein the previously described problems are eliminated.

In addition, a more specific object of the present invention is to provide a synchronizing method having a good tracking characteristic and which takes the product of two correlator outputs and uses a simple configuration to eliminate the need to achieve balance between the correlators.

In addition, another specific object of the present invention is to realize an automatic gain control (AGC) method which takes the correlation output in a synchronizing loop for pseudo-noise signals as reverse spread signals, and which produces no adverse influence to synchronizing tracking.

Another more specific object of the present invention is to provide a spread spectrum communications system by adding two correlation outputs in a synchronizing loop so that fluctuations of a signal level are substantially constant, and so to realize a synchronizing judgment method and AGC method which are strongly resistant to jitter in PN signals.

Another object of the present invention is to provide a spread spectrum communications system having a PN (pseudo noise) signal synchronizing circuit for synchronizing PN signals in the spread spectrum communications system for a carrier band of an intermediate frequency, the PN signal synchronizing circuit comprising a first PN signal generation function for generating 1-cycle PN signal having the same noise sequence as a noise sequence of a transmission system each clock cycle, a voltage control clock signal generation function, for generating clock signals for controlling timing of the generation of the PN signal in the first PN signal generation function, a first correlator for correlating the PN signal generated by the first PN signal generation function and a received signal received from the transmission system, so as to obtain a first signal by multiplying together the PN signal and the received signal, a second correlator for correlating the PN signal generated by the first PN signal generation function and the voltage control clock signal generated by the voltage control clock generation function so as to obtain second signal by multiplying together the PN signal and the voltage control clock signal, a first multiplication function for multiplying the first signal output from the first correlator and the second signal output from the second correlator, and a first filter function for filtering a product from the first multiplication function, obtaining a low-frequency component of the product, and for applying the product to the voltage control clock signal generation function for generating the PN signal.

Another object of the present invention is to provide the first PN signal generation function includes a first NRZ code PN signal generation function for generating a PN signal of a NRZ code which a negative voltage allocates with respect to a logical value of "0", and a positive value with respect to a logical value of "1" when the clock signal from the voltage control clock generation function is input, a first Manchester code PN signal generation function for generating a PN signal of a Manchester code a phase of which corresponds to a phase of the PN signal of the NRZ code, and the first correlator correlates by multiplying the received signal and the PN signal of the NRZ code generated by the generation function and abstracting a carrier frequency component from a product of the multiplication thus obtaining a first signal, the second correlator correlates by multiplying the received signal and the PN signal of the Manchester code generated by the first Manchester code PN signal generation function and abstracting a carrier frequency component from a product of the multiplication thus obtaining a second signal.

Another object of the present invention is to provide a spread spectrum communications system having a PN signal synchronizing circuit for PN signal synchronizing in the spread spectrum communications for a carrier band of an intermediate frequency, the PN signal synchronizing circuit comprising a PN signal generation function for generating 1-cycle PN signal having the same noise sequence as a noise sequence of a transmission system for each signal clock cycle, a voltage control clock generation function for generating control clock signals for control timing for the generation of the PN signal in the PN signal generation function, a first multiplication function for multiplying the received signal and the clock signal output from the voltage control clock generation function, a first correlator for multiplying the PN signal generated by the PN signal generation function and received signal received from the transmission system thus obtaining first signals, a second correlator for multiplying a product of the first multiplication function and the PN signal from the PN signal generation function thus obtaining second signal, a second multiplication function for multiplying the first signal output from the first correlator and the second signal output from the second correlator, and a filter function for filtering a low frequency component of an output of the second multiplication function, and for inputting the output of the filter function to the voltage control clock generation function for generating PN signals.

BRIEF DESCRIPTION OF THE DRAWINGS

FIG. 2 (A) shows an NRZ code, and FIG. 2 (B) shows a Manchester code;

FIG. 22 is a view of a PN signal synchronizing circuit using a Manchester code of a seventeenth embodiment according to the present invention;

FIG. 24 (B) shows a receiving system for the PN signal synchronizing circuit using a Manchester code of a nineteenth embodiment according to the present invention;

DESCRIPTION OF THE EMBODIMENTS

First Embodiment

The following is a description of a first embodiment of the present invention and is a typical method using the product of the output of two correlators.

Figure 4:
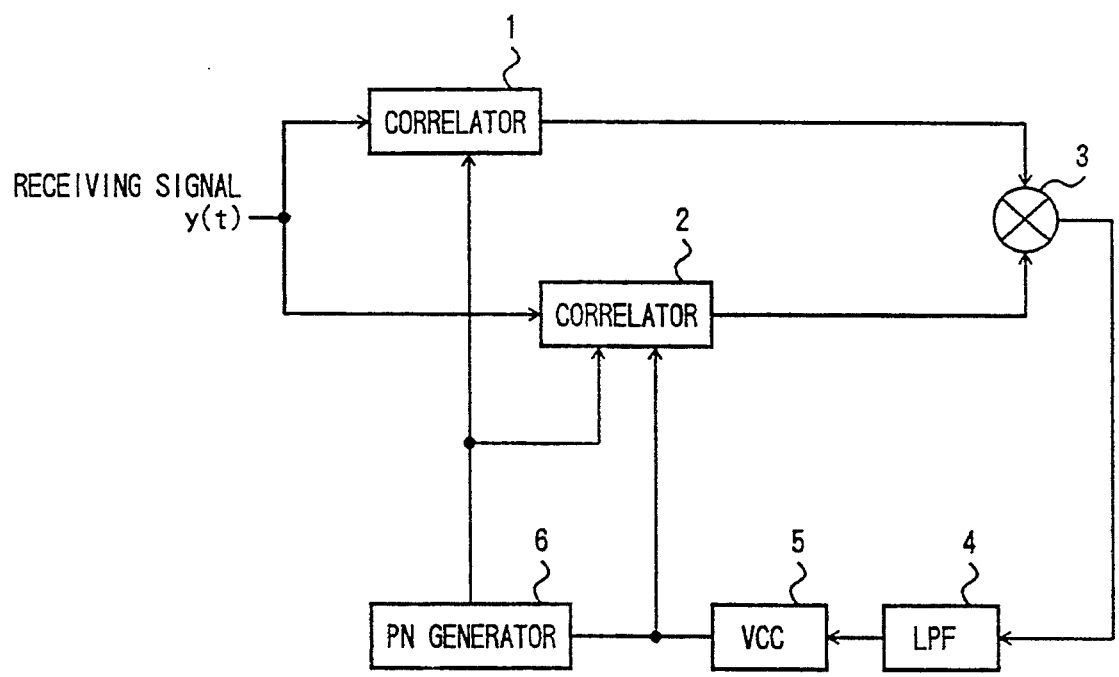
FIG. 4 is a view of a configuration of a typical PN signal synchronizing circuit in a spread spectrum communications system of a first embodiment according to the present invention.

FIG. 4 is a view of a configuration of a PN signal synchronizing circuit in a spread spectrum communications system of a first embodiment of the present invention. The figure shows a configuration using correlators 1, 2, a multiplier 3, a low pass filter (LPF) 4, a voltage controlled clock generator (VCC) 5 and a PN generator 6.

In the receiving systems of the spread spectrum communications system for the carrier band, the correlator 1 correlates the received signal y(t) and the PN signal from the generator 6. The correlator 2 correlates the received signal y(x), the PN signal from the generator 6 and the clock signal form the VCC 5. The multiplied signal from the correlators 1, 2 pass through the LPF 4 to become the control signal for the control clock for the PN signal.

Moreover, in the PN signal synchronizing method in a spread spectrum communications of a first embodiment of the present invention, the order of multiplying of the received signal (Y), the PN signal (P) and the control clock signal (C) can be divided into three patterns.

Figure 5:
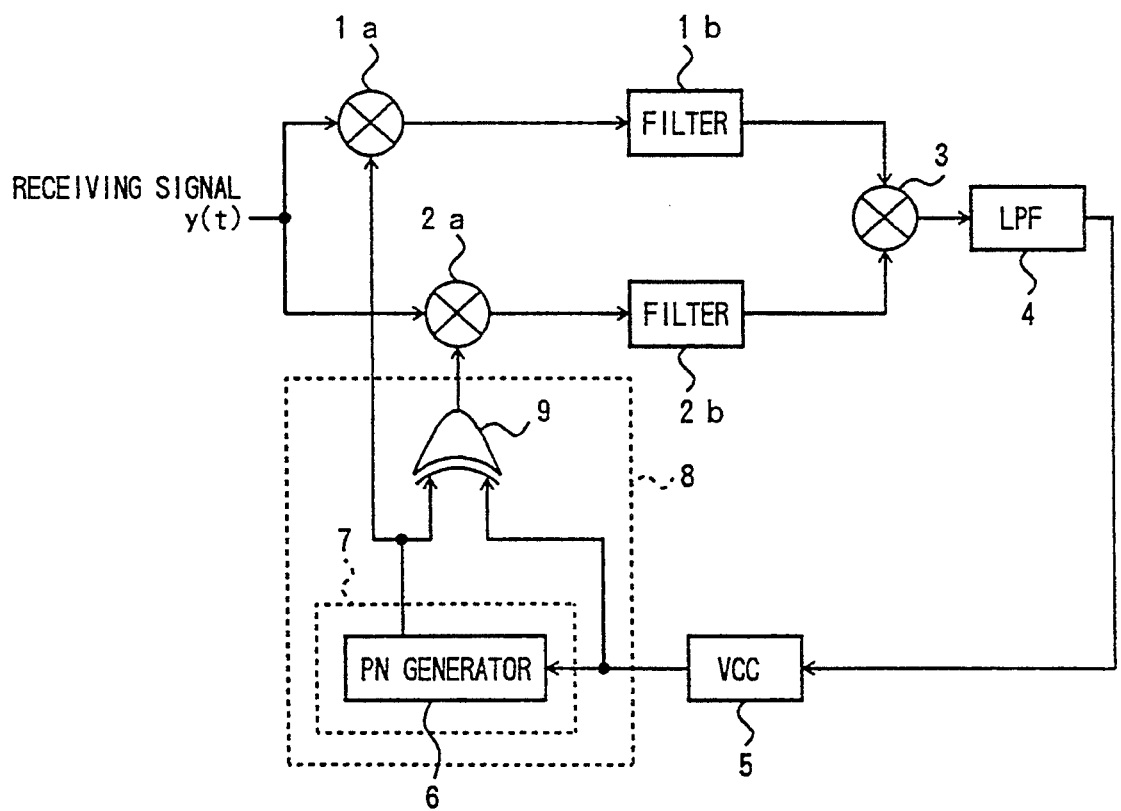
FIG. 5 is a view of a configuration of a PN signal synchronizing circuit in a spread spectrum communications system of a second embodiment according to the present invention.
Figure 6:
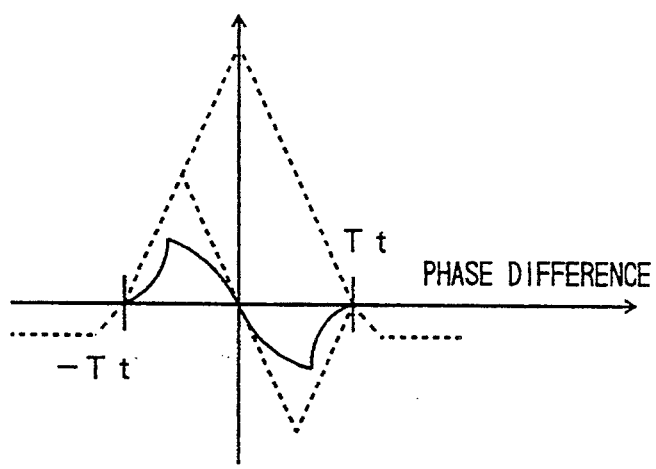
FIG. 6A and 6B show the output of a product of a correlator according to the present invention.
Figure 6:
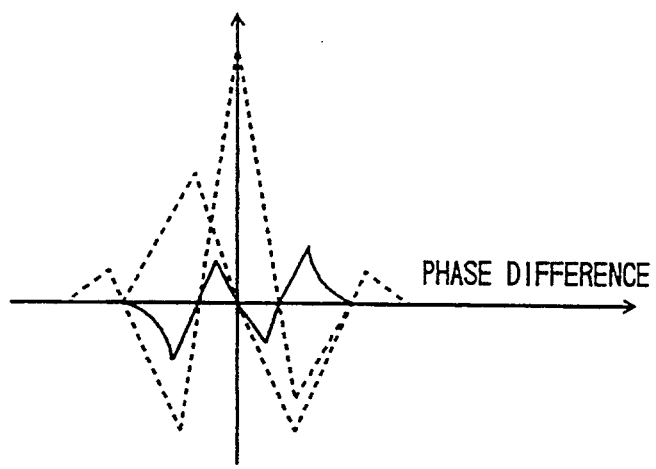

The first pattern (1) is shown in FIG. 5. This first pattern has the result of multiplication of the received signal (Y) and the PN signal (P) as the first signal S1; the control clock signal (C) and the PN signal (P) are multiplied and that result is multiplied by the received signal (Y) to give the second signal S2; the multiplier 3 then multiplies the first signal and the second signal together. This embodiment multiplies the control clock signal (C) and the PN signal (P) by the base band and so it is possible to perform multiplication by an EX-OR (Exclusive-OR) as shown in FIG. 5. Of course, the method of execution of this first pattern can be by multiplying the control clock signal (C) and the PN signal (P), which are placed on the carrier band of the intermediate-frequency as shown in FIG. 6, or by multiplying the PN signal (P) and the control clock signal (C) placed on the carrier band of the intermediate-frequency.

In addition, in this first pattern, the signal obtained from multiplying the clock signal with the NRZ code signal having "0" corresponding to a negative voltage and "1" corresponding to a positive voltage is the Manchester code signal, and so the method of realizing the present invention uses the case where the first signal using the result of multiplication of the received signal (Y) and the PN signal (P) for the NRZ code, and the second signal, using the result of multiplication of the received signal and the pseudo-noise signal of the Manchester code, which case is included within the range of types for the first pattern.

Figure 7:
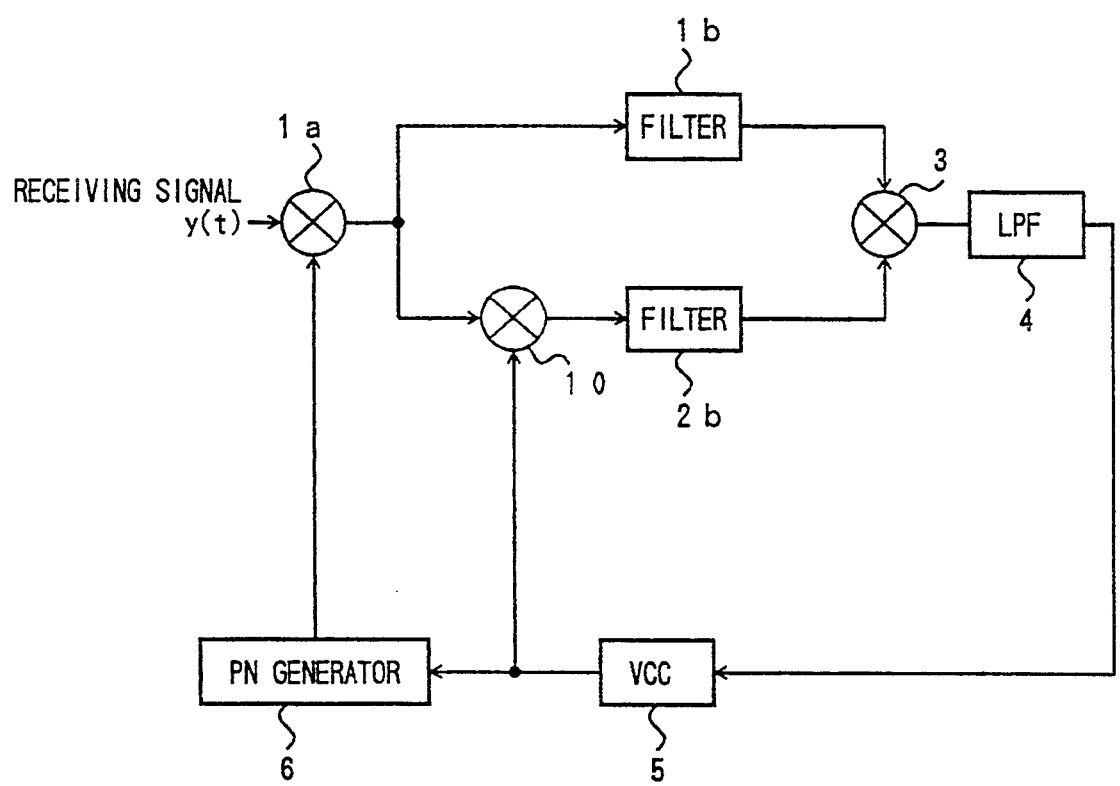
FIG. 7 is a view of a configuration of a PN signal synchronizing circuit in a spread spectrum communications system of a third embodiment according to the present invention.

As shown in FIG. 7, the second pattern (2) has the result of multiplication of the received signal (Y) and the PN signal (P) as the first signal S1, and the result of multiplication of the control clock signal (C) and the result of multiplication of the received signal (Y) and the PN signal (P) as the second signal S2. The configuration shown in FIG. 7 can be achieved with only one multiplier 1a for the multiplication of the received signal (Y) and the PN signal (P) to produce both signals and signal S2, but the second pattern clearly requires that these multipliers be separately provided.

Figure 8:
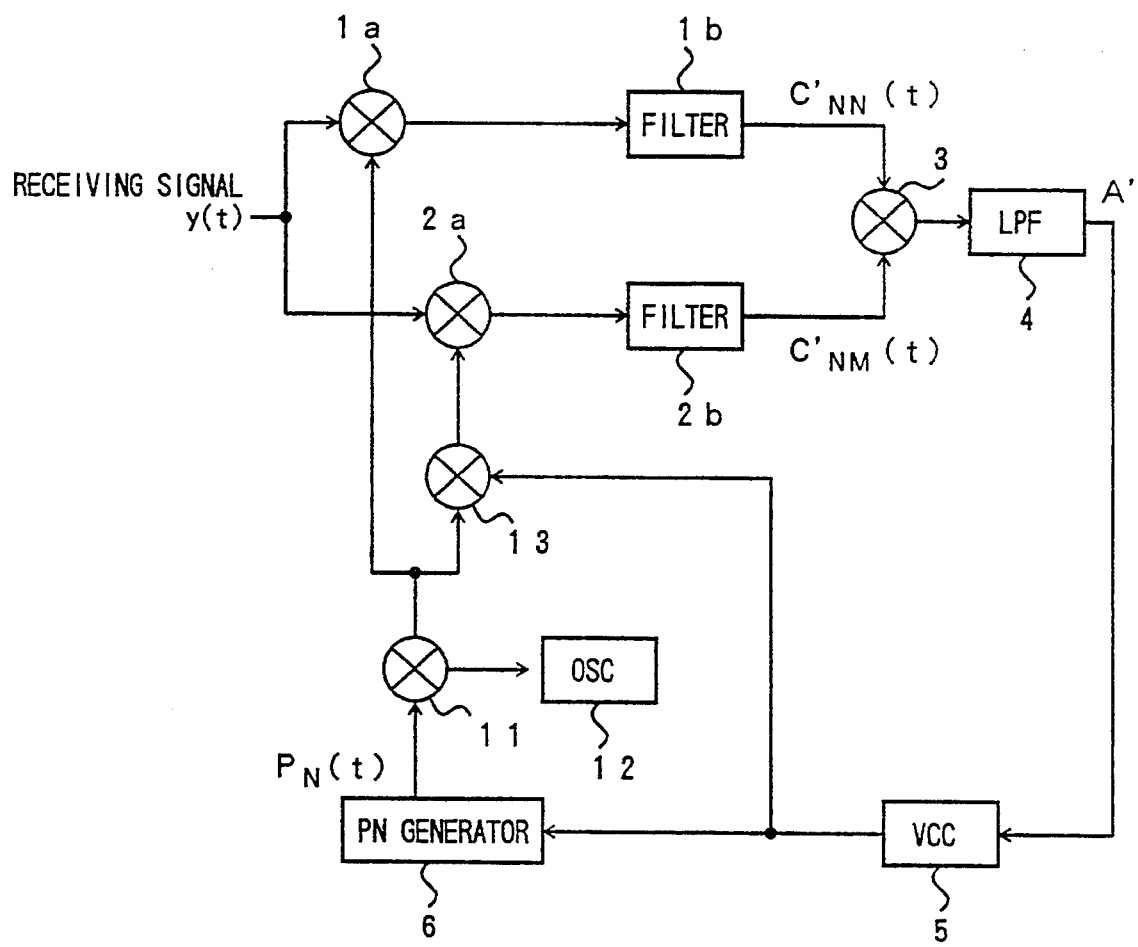
FIG. 8 is a view of a configuration of a PN signal synchronizing circuit in a spread spectrum communications system of a fourth embodiment according to the present invention.

As shown in FIG. 8, the third pattern (3) is a combination of the two patterns, as shown in the following Table 1.

TABLE 1

| Sync method | 1'st signal | 2'nd signal |
| --- | --- | --- |
| FIG. 5 (1) | Y × P | Y × (P × C) |
| FIG. 7 (2) | Y × P | (Y × P) × C |
| FIG. 8 (3) | Y × P | (Y × C) × P |

The following are specific descriptions of successive embodiments of the PN signal synchronizing method described above.

Second Embodiment

FIG. 5 is a view of a configuration of a PN signal synchronizing circuit in a spread spectrum communications system of a second embodiment according to the present invention. The system shown in the figure is constituted from the multipliers 1a, 2a, the NRZ code PN signal generator 7, the Manchester code PN signal generator 8 and the EX-OR (exclusive-OR) circuit 9. Other portions of the configuration shown in this figure are the same as those shown in FIG. 4, while portions having the same function as for the first embodiment (FIG. 4) are shown with corresponding numerals.

Figure 9:
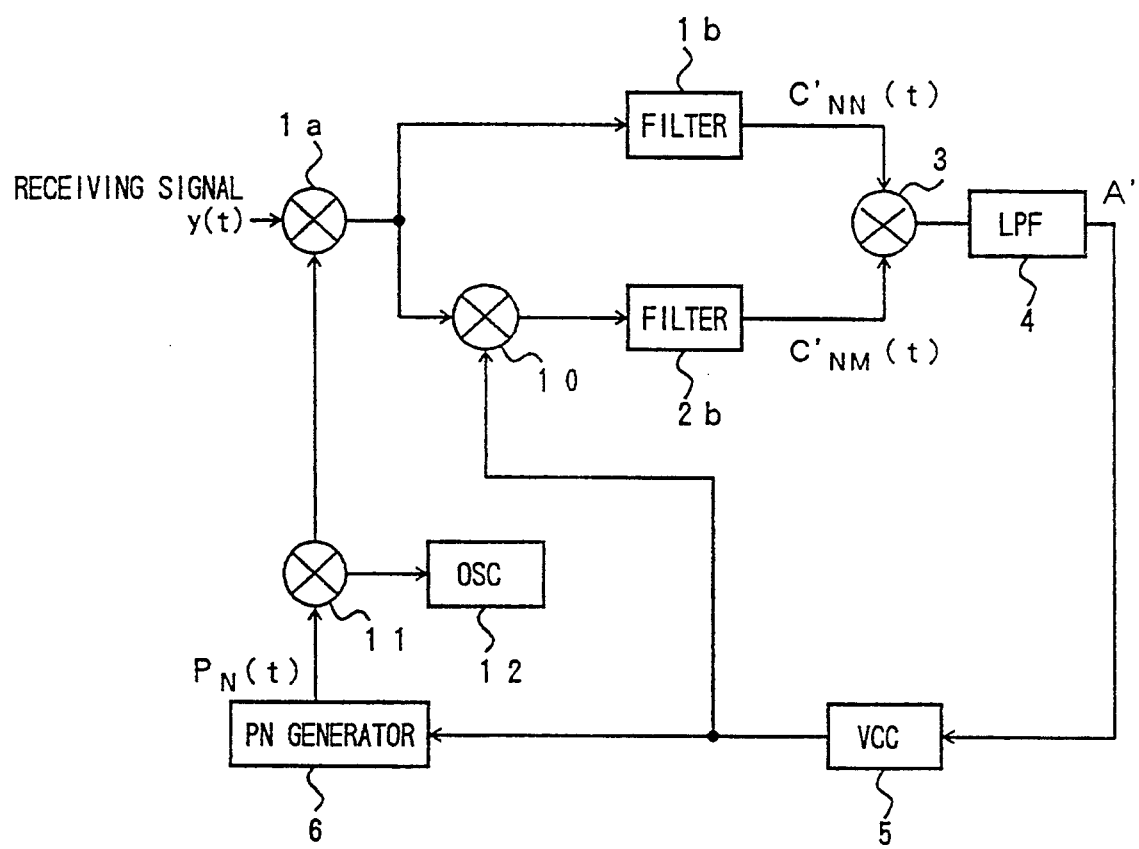
FIG. 9 is a view of a configuration of a PN signal synchronizing circuit in a spread spectrum communications system of a fifth embodiment according to the present invention.

In this embodiment, the logical values of "0" and "1" are used for both the NRZ code and the Manchester code. As shown in FIG. 9 (A), the NRZ code is coding which has the logical value of "0" allocated to a negative voltage and has the logical value of "1" allocated to a positive voltage. On the other hand, as shown in FIG. 9 (B), the Manchester code is coding which has the logical value of "0" allocated to a change in status from a positive voltage to a negative voltage and has the logical value of "1" allocated to a change of status from a negative voltage to a positive voltage.

Normally, the PN signals generated by the PN generator are PN signals of the NRZ code. In addition, a PN generator normally generates PN signals of 1-cycle for one cycle of the clock signal from the control clock, and so it is possible to convert them into the Manchester code from the NRZ code by calculating exclusive logical OR of the clock signal of the control clock and the signal of the NRZ code.

In the present embodiment, PN signals of the M-sequence code are used to spread the spectrum. The PN signal of an M-sequence code is known to have the self-correlation expressed as shown in FIG. 3 (A) when the codes are expressed in the NRZ code. Accordingly, the signals spread by the PN signals of an M-sequence code of the NRZ code in the transmission system produce output values expressed as shown in FIG. 3 (A) with respect to the phase difference when there is reverse spread by PN signals of the M-sequence code for the same NRZ code.

On the other hand, with the noise signal of the same M-sequence code, the correlation function can be expressed as shown in FIG. 3 (C) when one of the signals is expressed as NRZ code and the other signal is expressed as Manchester code. Accordingly, in the transmission system, when there is reverse spread by a PN signal expressed by the Manchester code of a signal spread by the PN signal of an M-sequence code of the NRZ code which is the same M-sequence code in the receiving system, the output values with respect to phase difference are obtained as shown in FIG. 3 (C).

The PN signal generator 6 in FIG. 5 generates PN signals of the NRZ code of the same system as the transmission system, using the clock signal from the VCC 5. The EX-OR circuit 9 calculates the exclusive logical OR ox f the clock signal from the VCC 5 and the PN signal generated by the PN signal generator 6. By doing this, the PN signal has the NRZ code converted into the Manchester code. Alternatively, instead of the EX-OR circuit 9, the present embodiment can use a separate PN signal generator to generate the PN signal of the Manchester code.

The multipliers 1a, 2a multiply the PN signal of the NRZ code and the PN signal which have been Manchester coded and produces the received signal y(t).

The outputs of the multipliers 1a, 2a are respectively input to the filters 1b, 2b and the carrier frequency components thereof are abstracted. The filters 1b, 2b are low-pass filters (LPF) or band pass filters (BPF). Signals output from the filters 1b, 2b are multiplied together by the multiplier 3 and only the low-frequency component is then obtained by the low-pass filter. The signal comprised of the low-frequency component is then supplied as a control signal to the VCC 5 and thus closing the synchronizing loop.

The following is a description of the operation.

y(t) is the received signal, P(t) is the information signal included in the received signal, $P'_N(t)$ is the spread signal. Here, the information signal D(t), and the spread signal $P'_N(t)$ are digital values expressed by −1 and 1 respectively. In addition the received signal can be expressed by the following equation (1) when the angular velocity of the carrier-frequency (the angular velocity of the intermediate frequency when became to the intermediate frequency) is expressed as $\omega_c$. and the phase difference of an arbitrary carrier frequency is expressed as $\Phi$.

$$y(t) = D(t)P'_N(t) \cos(\omega_c t + \Phi) \quad (1)$$

In the receiving system, the PN signal generator 6 generates PN signals of the NRZ code and these signals are made PN signal $P_N(t)$. The PN signal $P_N(t)$ made by the transmission system. In addition, the PN signal of the Manchester code $P_m M(t)$ which is made by the EX-OR circuit 9 from the above mentioned PN signal and the clock signal.

The PN signal $P'_N(t)$ of the NRZ code and which is generated by the receiving system have their correlation with the received signal y(t) correlated by the multiplier 1a and the filter 1b. The PN signal $P'_N(t)$ in the received signal is the NRZ code, and so the correlation value is expressed as shown by FIG. 3 (A). This correlation value is as expressed in the following equation (2) when the output from the filter 1b is written $C_{NN}(t)$.

$$C_{NN}(t) = D(t)R_{NN}(\Delta t) \cos(\omega_c t + \Phi) \quad (2)$$

In the same manner, the PN signal $P_M(t)$ of the Manchester code has its correlation with the received signal y(t) correlated by the multiplier 2a and the filter 2b. The correlation value is expressed as shown in FIG. 3 (C) since it is the correlation between the PN signal of the Manchester code and the PN signal of the NRZ code. $C_{NM}(t)$ is expressed by the following equation (3) when this correlation value is expressed as $R_{NM}(\Delta t)$ and the output from the filter 2b is expressed as $C_{NM}(t)$.

$$C_{NN}(t)R_{NM}(\Delta t) \cos(\omega_c t + \Phi) \quad (3)$$

These signals are multiplied by the multiplier 3, and the multiplied signals are expressed by the following equation(4).

$$C_{NN}(t) \times C_{NM}(t) = D^2(t)R_{NN}(\Delta t) \cos^2(\omega_c t + \Phi) \quad (4)$$

Then, the low-pass filter 4 passes only the low-frequency component of the multiplication result signal. Here, the low-pass filter 4 satisfies the required function if it has a prohibit region which removes only the $2\omega_c$ component of $\cos^2(\Delta_c t + \omega)$ of equation (4). If the signal which abstracts low-frequency component is indicated as A, then, A can be expressed by the following equation (5).

$$A = \overline{C_{NN}(t) \times C_{NM}(t)} \quad (5)$$

$$\overline{C_{NN}(t) \times C_{NM}(t)} = \frac{1}{2} D^2(t)R_{NN}(\Delta t)R_{NM}(\Delta t)$$

Figure 1:
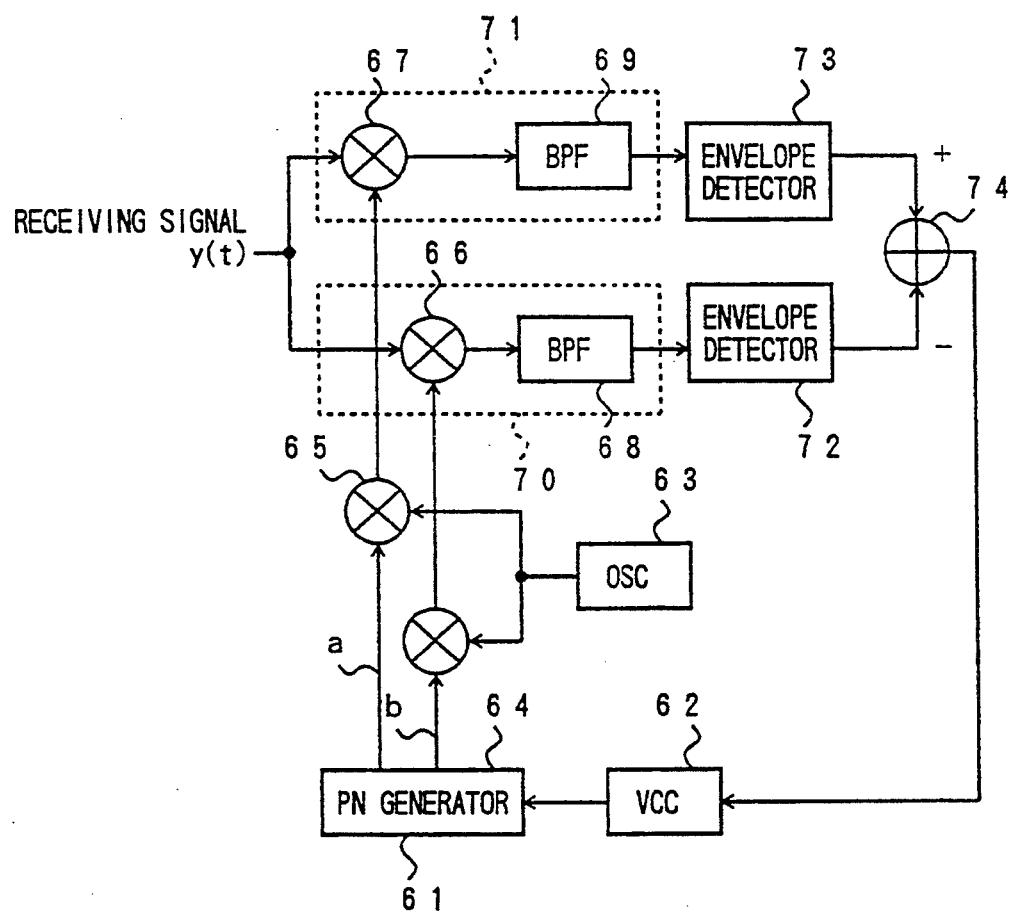
FIG. 1 is a view of a configuration of a non-coherent delay locked loop (DLL)
Figure 3A:
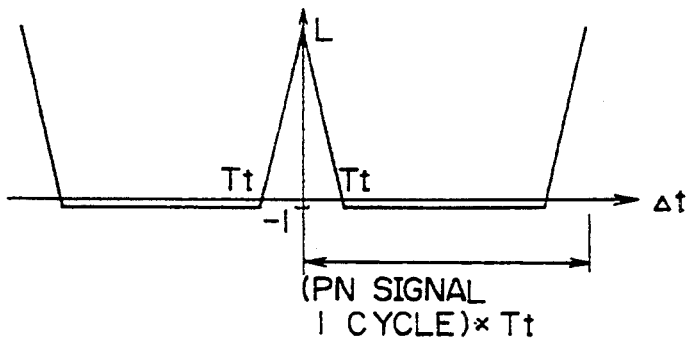
FIG. 3 (A), (B), (C) show a correlation function.

In this equation (5), D(t) is a value of either 1 or −1 and so the squared value thereof is always 1. Therefore, the low-frequency component A exists only for the time displacement of $\Delta t$. Then, $R_{NN}(\Delta t)$ and $R_{Nm}(\Delta t)$ are expressed as shown in FIG. 3A and so this product becomes the characteristic of FIG. 6 (A). Accordingly, this is a signal which corresponds to the phase difference and so it is possible to comprise a synchronizing loop of a PN signal phase by feedback to the VCC 5 thereof.

Third Embodiment

FIG. 7 is a view of a configuration of a PN signal synchronizing circuit in a spread spectrum communications system of a third embodiment according to the present invention.

The third embodiment described below multiplies the received signal y(t) and the PN signal of the NRZ code; multiplies the signal S2 from the carrier frequency component, the PN signals of the Manchester code, and the received signal y(t); obtains the signal S2 from the carrier frequency component; multiplies signals S1 and S2 and takes the low-frequency component thereof, and makes this low-frequency component the control signal source for the control clock. The numerals in the figure correspond to those of FIG. 5.

The following is a description of the operation.

The PN signal generator 6 uses the clock signals from the VCC 5 to generate the PN signal $P_N(t)$ of the NRZ code. The multiplier 1a takes the product of the generated PN signal and the received signal y(t). The signal S1 thus obtained is input to a multiplication and to the filter 1b, and a correlation between the received signal y(t) and the PN signal $P_N(t)$ of the NRZ code is obtained. At this time, the output from the filter 1b is expressed by the previous equation (2).

The multiplier 10 multiplies the other of the signals from the multiplier 1a with the clock signal output from the VCC 5. When the Manchester code is made with respect to FIG. 5 in the second embodiment, the exclusive logical OR (EX-OR) is calculated between the clock signal and the PN signal of the NRZ code; however, taking the exclusive logical OR between the clock signal and the PN signal of the NRZ code produces the same result as multiplying the clock signal and the PN signal of the NRZ code. Accordingly, even if the clock signal is multiplied after the product of the received signal and the PN signal $P_N(t)$ of the NRZ code is taken, this above method has the same output signal as if the product of the received signal and the PN signal of the Manchester code has been taken. Accordingly, the output of the multiplier 2a of FIG. 5 and the output of the multiplier 10 of FIG. 7 are the same.

For this reason, the output of the filter 1b becomes $C_{NN}(t)$ and the output of the filter 2b becomes $C_{Nm}(t)$ and so multiplying $C_{NN}(t)$ and $C_{NM}(t)$ and taking the low-frequency component enables control signal for the control clock to be obtained.

Fourth Embodiment

FIG. 8 is a view of a configuration of a PN signal synchronizing circuit in a spread spectrum communications of a fourth embodiment according to the present invention. The configuration shown in the figure is the configuration of the third embodiment shown in FIG. 7 to which multipliers 11, 13 and an OSC 12 have been added. The OSC 12 generates oscillation signals of a frequency equal to the carrier frequency $\omega_c$ displaced by the intermediate frequency $\omega_O$. However, the filter 1b and the filter 2b are either low-pass filters or band-pass filters which pass signals in the region of the intermediate frequency $\omega_O$.

The following is a description of the operation of the configuration shown in FIG. 8.

The PN signal generator 6 uses the clock signal from the VCC 5 to generate PN signal $P_N(t)$ of the NRZ code. The generated PN signal is multiplied with the local oscillation signal from the OSC 12 and is then split.

The multiplier 1a multiplies one of these signals with the received signal y(t) and the intermediate frequency component of this is extracted by the filter 1b. The output $C'_{NM}(t)$ from the filter 1b is expressed by the following equation (6), where the local oscillation frequency is expressed by $\omega_C \pm_O$.

$$C'_{NM}(t) = D(t) R(\Delta t) \cos(\omega_O) + \Phi \qquad (6)$$

The multiplier 13 multiplies the thereof the two divided signals with the clock signal of the VCC 5 and then the multiplier 2a and the filter 2b taken the correlation with the received signal y(t). As described previously with reference to FIG. 7 for the third embodiment, taking the exclusive logical OR of the clock signal and the PN signal of the NRZ code produces the same result as multiplying the clock signal with respect to the PN signal of the NRZ code. Accordingly, this method has the same output signal as if the product of the received signal and PN signal of the Manchester code had been taken, even if the PN signal $P_N(t)$ of the NRZ code is up-converted by the multiplier 11, using the local oscillator signals and multiplied with the clock output from the OSC 12. Accordingly, the output $C'_{NM}(t)$ Of the multiplier 2a and the filter 2b from the correlation between the received signals y(t) and the output signal form the multiplier 13 is expressed by the following equation $$C_{NM}(t) R_{NM}(\Delta t) \cos(\omega_0 + \Phi) \qquad (7)$$

Accordingly, the low-frequency signal "A'" which is represented by equation (6) and equation (7) as multiplied in the multiplier 3, and has only the low-frequency component passed by the low-pass filter 4 is given by the following equation (8).

$$A' = \overline{C_{NN'}(t) \times C_{NM'}(t)} \qquad (8)$$

$$\overline{C_{NN'}(t) \times C_{NM'}(t)} = \frac{1}{2} D^2(t) R_{NM}(\Delta t)$$

Accordingly, the right side of equation (8) is the same as that of equation (5) and so it is possible to constitute a PN signal phase synchronizing loop by feedback of the signal "A'" to the VCC 5.

Fifth Embodiment

FIG. 9 is a view of a configuration of a PN signal synchronizing circuit in a spread spectrum communications of a fifth embodiment of the present invention. In the figure, the reference numerals are the same as those shown in FIG. 5 and FIG. 7.

The following is a description of the operation of the circuit shown in FIG. 9.

The operation is the same as that described for the third embodiment with reference to FIG. 7 but the PN signal from the PN signal generator 6 is a local oscillation signal from the local oscillator (OSC) 12 and differ only in the up-converted portion in the multiplier 11.

As described for embodiments with reference to FIG. 7 and FIG. 8, taking the exclusive logical OR between the clock signal and the PN signal of the NRZ code produces the same result as multiplying the clock signal and the PN signal of the NRZ code. Therefore, even if the PN signal $P_N(t)$ of the NRZ code unconverted by the local oscillation signal, multiplied with the received signal and then multiplied with the clock signal, this method has the same output as the case for when the product of the received signal and the PN signal of the Manchester code is taken.

Accordingly, the output of the filter 1b is expressed by the previous equation (6), and the output of the multiplier 2b is expressed by the previous equation (7) and so, in the same manner as in the fourth embodiment described with reference to FIG. 8, the present embodiment takes the product of the output $C'_{NN}(t)$ of the filter 1b and the output $C'_{NM}(t)$ of the filter 2b, uses the LPF 4 to take the signal "A'" of the low-frequency component and feeds it back to the VCC 5.

By this, it is possible to comprise a PN signal phase synchronizing loop.

Sixth Embodiment

Figure 10:
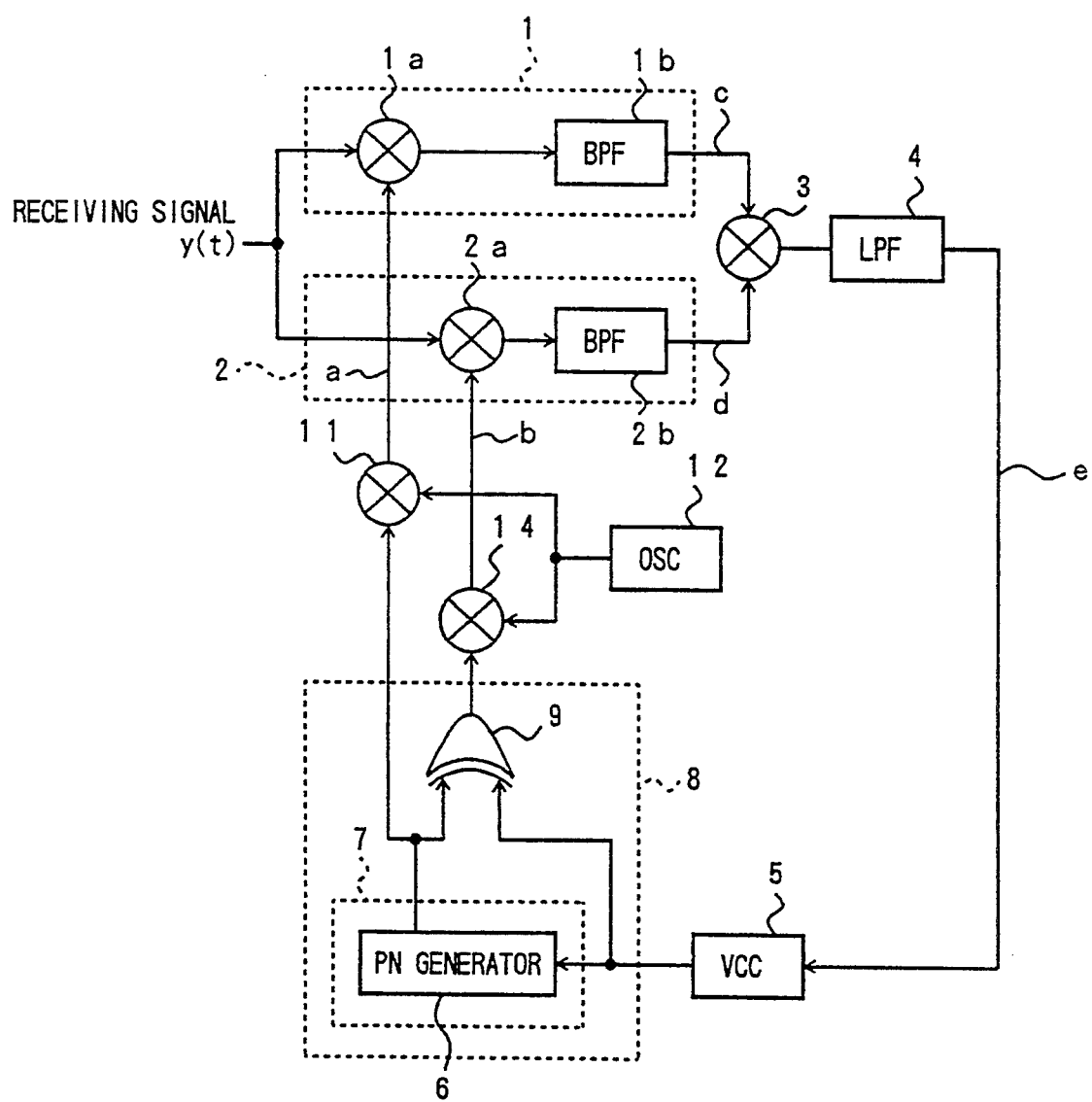
FIG. 10 is a view of a configuration of a PN signal synchronizing circuit in a spread spectrum communications system of a sixth embodiment according to the present invention.

FIG. 10 is a view of a configuration of a PN signal synchronizing circuit in a spread spectrum communications of a sixth embodiment according to the present invention. In the figure, the multiplier 14 has been added to the configuration, while the other portions correspond to the configuration of FIG. 5, FIG. 6, FIG. 7 and FIG. 9 and are shown with corresponding numerals.

The PN signal generator 6 uses the clock signal from the VCC 5 to generate a PN signal having the same NRZ code as the signal from the transmission system. The PN signal normally uses a PN signal of an M-sequence code.

The EX-OR circuit 9 takes the exclusive logical OR of the clock signal from the VCC 5 and the PN signal generated by the PN signal generator 6.

By this, the PN signal converts the NRZ code into the Manchester code. The OSC 12 creates a local oscillation signal having the carrier frequency displaced by the intermediate frequency.

The PN signal of the NRZ code and the PN signal which have been Manchester coded are respectively multiplied with the local oscillation signal in the multipliers 11 and 14, and are upconverted. They are then multiplied with the received signal y(t) by the multipliers 1a, 2a respectively.

The outputs of the multipliers 1a, 2a are respectively input to the band pass filters 1b, 2b and only the intermediate frequency component is extracted. Then, the extracted signal is multiplied by the multiplier 3 and the low pass filter 4 extracts only the low-frequency component. This signal of the low-frequency component is supplied to the VCC 5 as the control signal source and thus the synchronizing loop is constituted.

The following is a description of the operation.

y(t) is the received signal, D(t) is the information signal included in the received signal y(t), and the spread signal is P'(t). Here, the information signal D(t) and the spread signal P'$_N$(t) are digital values expressed as −1 or 1. In addition, if the angular velocity of the carrier is expressed as "$\omega_c$", it is possible for the received signals to be expressed by the following equation(9).

$$y(t) = D(t)P_N(t) \cos \omega_c t \tag{9}$$

In the receive system, the PN signal of the NRZ code created by the PN signal generator 6 is specified P$_N$(t). The PN signal P$_N$(t) created at this time is of the same series as the PN signals P$_N$(t) created by the transmission system. In addition, the PN signal of the Manchester code created by the EX-OR circuit 9 from the above PN signal and the clock signal is specified P$_M$(t). Furthermore, if the angular velocity of the carrier frequency is expressed as "$\omega_c$", the local oscillation signal created by the OSC 12 can be expressed by "$\omega_c + \omega_0$" since the angular velocity "$\omega_0 c$" of the carrier is displaced by "$\omega$. In addition, an arbitrary phase difference is specified "$\Phi$". If this is done, then the signal a(t) at point "a" and signal b(t) at point "b" are respectively expressed by the following equation (10) and equation (9).

$$a(t) = P_N(t) \cos ((\omega_c + \omega_0)t + \Phi) \tag{10}$$

$$i\ b(t) = P_M(t) \cos ((\omega_c + \omega_0)t + \Phi) \tag{11}$$

The products of these signals a(t), b(t) and the received signal are taken by the multipliers 1a, 2a respectively, and the band pass filter 1b and the band pass filter 2b pass only the respective intermediate frequency components. Simultaneous with the taking of the correlation between the PN signal in the received signal y(t) and the PN signals P$_N$(t), P$_M$(t) in the receive system.

Here, the correlation between the PN signal is P'$_N$(t). In addition, the correlation between the PN signal P'$_N$(t) and the PN signal P$_M$(t) is specified R$_{NM}$ ($\Delta$t). $\Delta$t is the temporal displacement between P'$_N$(t) and P$_N$(t).

If this is done, then R$_{NN}$ ($\Delta$t) is the value for the correlation between pairs of the PN signal of the NRZ code in the M-sequence code; the corresponding characteristic is known to be given as in FIG. 3 (A). In addition, R$_{NM}$ (t) is the value for the correlation between the PN signal of the Manchester code and the PN signal of the NRZ code; the corresponding characteristic is known to be given as in FIG. 3 (C).

Accordingly, signals at the point c and b are given by the following equations (12), (13).

$$c(t) = \tfrac{1}{2}D(t)R_{NN}(\Delta t) \cos (\omega_0 + \Phi) \tag{12}$$

$$d(t) = \tfrac{1}{2}D(t)R_{NM}(\Delta t) \cos (\omega_0 + \Phi) \tag{13}$$

These signals are multiplied by the multiplier 3, as expressed by the following equation (14).

$$c(t) \times d(t) = \tfrac{1}{4}D^2(t)R_{NN}(\Delta t)R_{NM}(\Delta t) \cos^2(\omega) + \Phi) \tag{14}$$

Then, only the low-frequency component of this signal passed by the low-pass filter 4 and the resulting signal is specified e(t) as is expressed by the following equation (15).

$$e(t) = \tfrac{1}{4}D^2(t)R_{NN}(\Delta t)R_{NM}(t) \tag{15}$$

In equation (15), the information signal D(t) is a value of either 1 or −1, and its square is always 1; thus e(t), which is the control signal for the VCC 5 is dependent only upon $\Delta$t. Then, R$_{NN}$ ($\Delta$t) and R$_{MN}$($\Delta$t) are expressed as shown in FIG. 3 above: the product thereof thus becoming the characteristic of FIG. 6 (A). Accordingly, the phase difference and so it is possible for it to be used as the control signal for the VCC 5.

Seventh Embodiment

Figure 11:
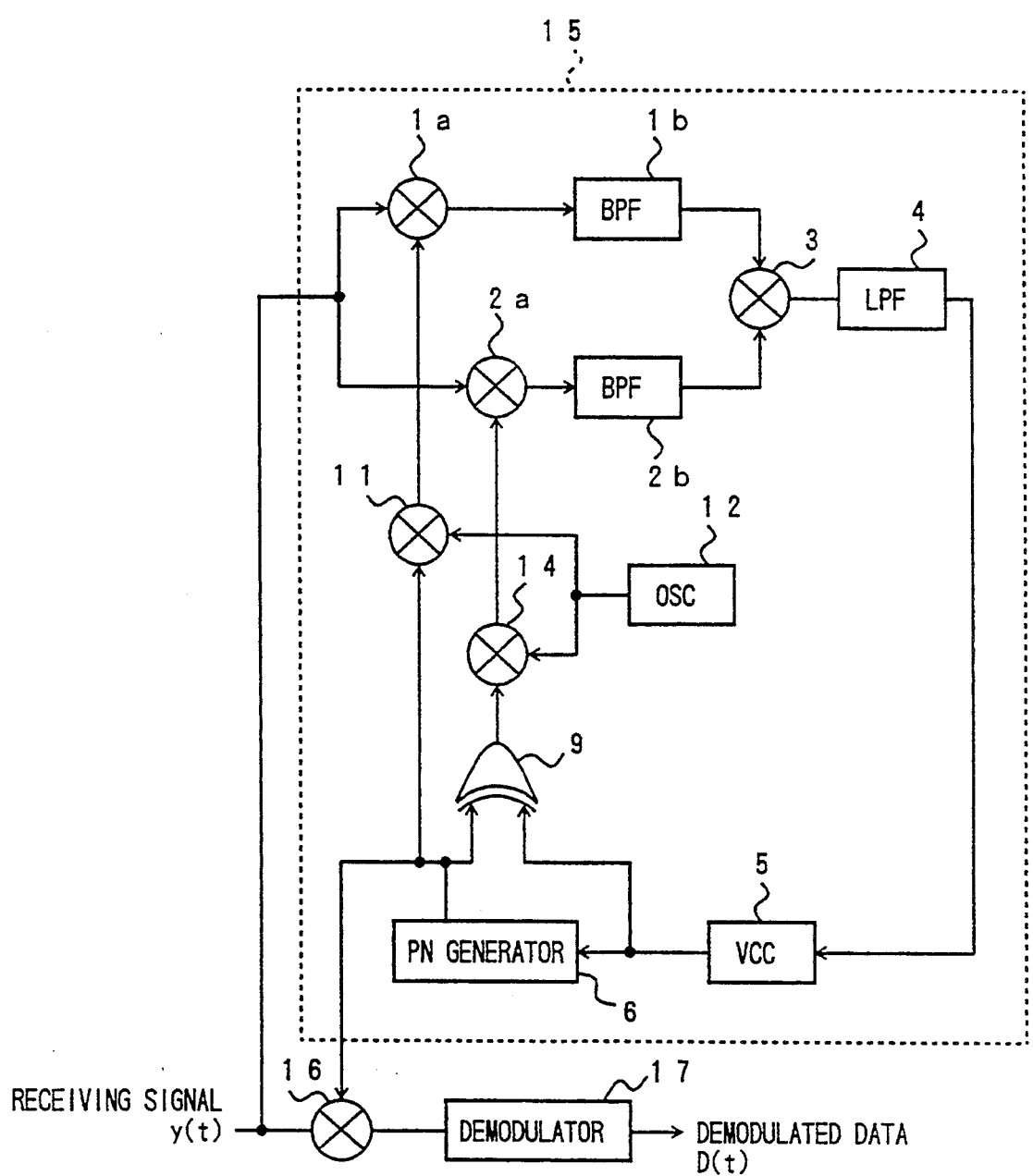
FIG. 11 is a view of a configuration of a PN signal synchronizing circuit and demodulation method in a spread spectrum communications system of a seventh embodiment of the present invention.

FIG. 11 is a view of a configuration of PN signal synchronizing circuit and demodulation method in a spread spectrum communications system of a seventh embodiment according to the present invention. In the present embodiment the multiplier 16 and the demodulator 17 are added to the synchronizing circuit 15 to demodulate the information of the received signal.

The following is a description of the operation of the circuit of FIG. 11.

The received signal y(t) is split, where upon another signal thereof is transferred to the PN signal synchronizing circuit 15 and a PN signal in synchronizing with the PN signal in the received signal are generated by the method described with reference to the sixth embodiment. The PN signal generated by this PN signal synchronizing circuit 15 is multiplied with the received signals "D(t)P$_N$(t) cos $\omega$t" in the multiplier 16, is reverse-spread, obtains "D(t) R$_{NN}$COS $\omega$t" without the PN signal, and then converted into the base band by the demodulator 17 to restore the information. Accordingly, the constitution of this embodiment enables demodulation of the information without the PN signal.

Eighth Embodiment

Figure 12:
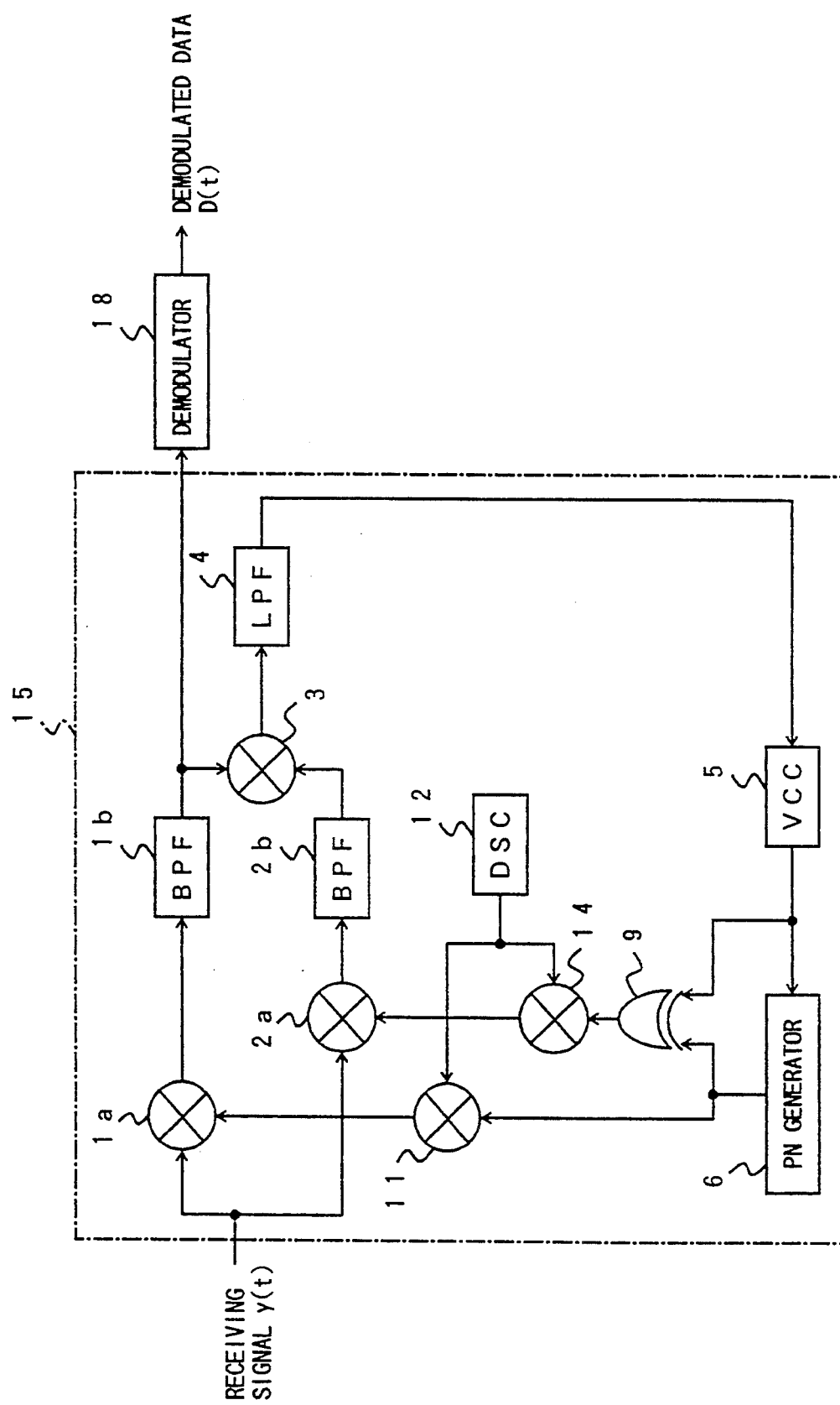
FIG. 12 is a view of a configuration of a PN signal synchronizing circuit and demodulation method in a spread spectrum communications system of a eighth embodiment according to the present invention.

FIG. 12 is a view of a configuration of a PN signal synchronizing circuit and demodulation method in a spread spectrum communications system of an eighth embodiment according to the present invention. The configuration shown in the figure has the output from the BPF 1b inside the PN signal synchronizing circuit 15 demodulated by the demodulator 18 provided external to the synchronizing circuit. The configuration inside the PN signal synchronizing circuit 15 is the same as that shown in FIG. 11.

The following is a description of the operation.

The received signal y(t) is sent to the PN signal synchronizing circuit 15 and synchronizing with the PN signal inside the received signal is taken. In the synchronizing loop, the output from the band pass filter 1b is sent to the data demodulation portion 18 and demodulation of the data is performed. Here, the output of the band pass filter 1b is given by the previous equation (12). When synchronizing is performed, the temporal displacement "R$_{NN}$" becomes "0" and the correlation value "R$_{NN}$" becomes a constant value is clear by the characteristic shown in FIG. 3. Accordingly, the previous equation (12) is the same as the binary PSK signals which have been lowered to the intermediate frequency and it is possible to demodulate the data by the data demodulator 18.

In this manner, the signal sent to the data demodulator 18 is a signal for which the information has been reverse-spread and which has been dropped to the intermediate frequency and therefore has the advantage of facilitating demodulation.

Therefore, the correlation between the received signal and the PN signal of the Manchester code, and the correlation between the received signal and the PN signal of the NRZ code are obtained by the intermediate frequency band in the same manner as a DLL so that multiplying these two signals prevents inversion of the correlation value to the information signal and simultaneously cancels pairs of intermediate frequency components.

The remaining embodiments, described below with reference to FIG. 13~FIG. 20, use the embodiments for the DLL described before with reference to FIG. 5~FIG. 9, and are used in an AGC (Automatic Gain Control) method for the correlation value for the PN signal synchronizing circuit of the embodiments of FIG. 10~FIG. 12, and for a synchronizing judgment method.

Ninth Embodiment

Figure 13:
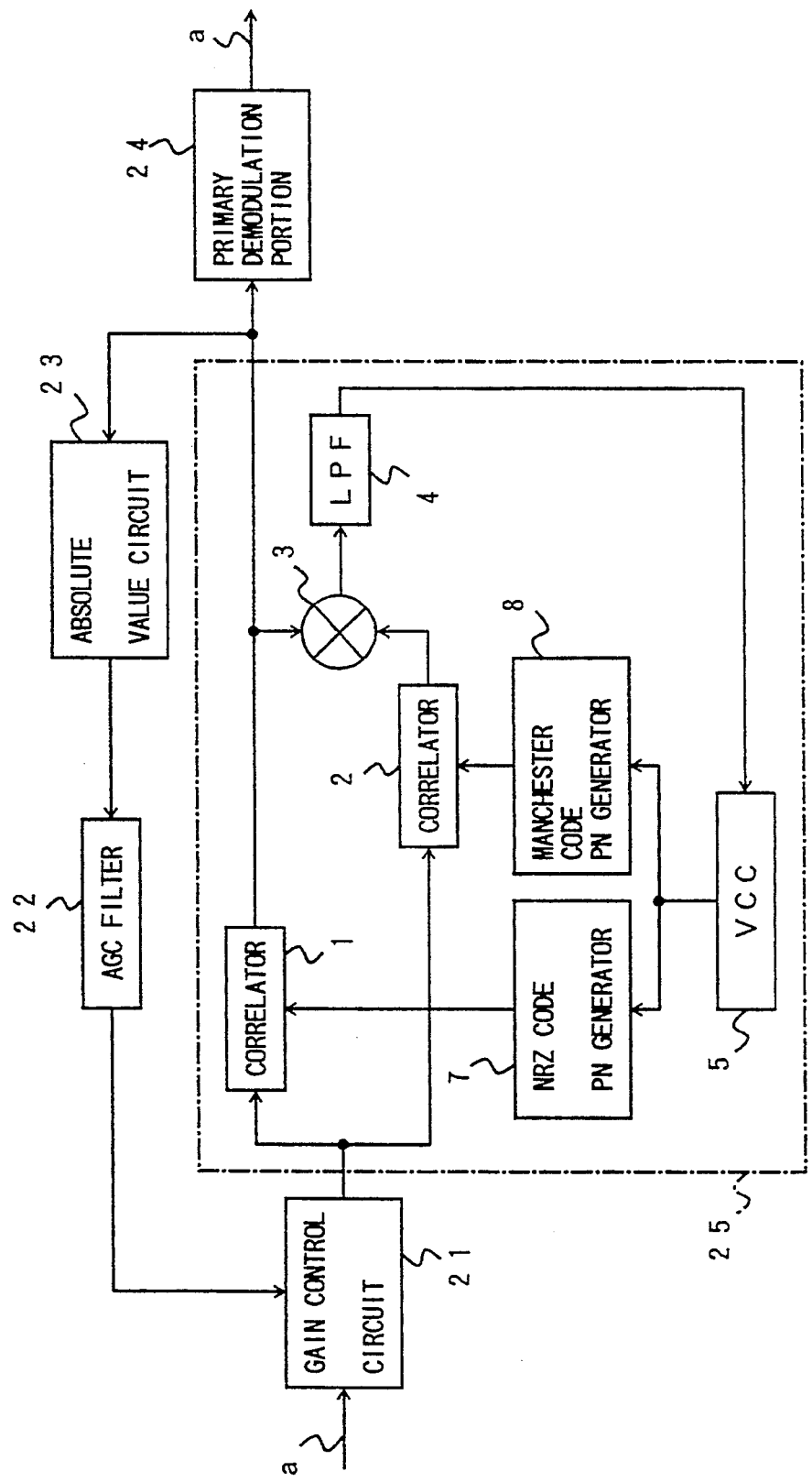
FIG. 13 is a view of a configuration of a PN signal synchronizing circuit in a spread spectrum communications system of a ninth embodiment according to the present invention being applied to a gain control circuit.

FIG. 13 is a view of the output of the PN signal synchronizing circuit in a spread spectrum communications system of a ninth embodiment according to the present invention being applied to a gain control method, and is the synchronizing circuit 25 of the second embodiment described with reference to FIG. 5, to which an AGC has been added. In the figure, the gain control circuit (AGC) 21, the AGC filter 22, the absolute value circuit 23 and the primary demodulation portion 24 have been added to the synchronizing circuit 25, these add portions have the same function as the configuration shown in FIG. 5 and indicated with corresponding numerals.

The gain control circuit 21 controls the gain of the received signals input from the terminal "a". The AGC filter 22 is a filter for the gain control circuit 21. The absolute value circuit 23 is for obtaining the absolute value (amplitude) of the output of the reverse-spread signals from the synchronizing circuit 25. The reverse-spread signal from the synchronizing circuit 25 undergoes primary demodulation in the primary demodulation portion 24 and is returned to information signal in the base band which is then output to the terminal "b" as demodulated data. The synchronizing circuit 25 performs synchronizing for the PN signal and also performs reverse-spread for the received signal. In the synchronizing circuit 25, the VCC 5 supplies the clock signal which drives the PN signal generator 8 for the Manchester code and the PN signal generator 7 for the NRZ code. The correlator 1 correlates between the PN signals of the Manchester code and the PN signals of the NRZ code, the correlation being taken at a level suitable for the gain control circuit 21. In the same manner, the correlator 2 takes a correlation between the PN signal of the Manchester code and the received signal; and the multiplier 3 multiplies the output signals from the correlator 1 and the correlator 2. The low-frequency component of this output is taken by the LPF 4 and is fed back to the VCC 5.

Here, the output from the PN signal generator 7 of the NRZ code and the output from the PN signal generator 8 of the Manchester code can be respectively multiplied with the local oscillator signals in order to convert them to the intermediate frequency.

The following is a description of the operation.

The description will commence with a simple description of the operation of the synchronizing circuit 25.

The PN signal generator 7 of the NRZ code and the output from the PN signal generator 8 of the Manchester code respectively generate PN signal in accordance with the clock speed. Here, the generated PN signals are of the same series as the PN signals used in the transmission system. In addition, the PN signals used here assume a PN series of an M-sequence code.

The generated PN signal of the NRZ code and the PN signal of the Manchester code have their respective correlations with the received signals taken by the correlator 1 and the correlator 2 respectively. When the PN signal of the M-sequence is used, the self-correlation function of the NRZ code is known to be expressed as in FIG. 3 (A). In addition, the PN signal of the Manchester code and the PN signal of the NRZ code are known to be expressed as in FIG. 3 (C). Therefore, the characteristic of the correlator 1 is expressed as in FIG. 3 (A) and a signal of an amplitude corresponding to the phase difference of the PN signal is output. In the same manner, the characteristic of the correlator 2 is expressed as in FIG. 3 (C) and a signal of an amplitude corresponding to the phase difference of PN signals is output.

The signals output from these two correlators are multiplied by the multiplier 3 and only the low-frequency component is taken by the LPF 4. Therefore, the carrier component and the information signal component of the received signals are canceled and only a signal for the component which is the product of the two correlation values remain. As shown in FIG. 6 (A), the signal for the component which is the product of the above two correlation values can produce an output corresponding to the phase difference of the PN signals thus feeding this product back to the VCC 5 enables synchronizing tracking of the PN signals.

Synchronizing tracking of the PN signals is performed by the synchronizing circuit 25 as described above, but when the synchronizing circuit 25 holds synchronizing state, the output of the correlator 1 becomes a signal which is the reverse-spread of the received signal. Because of this, it is possible to take the output of this correlator 1, thereby eliminating the necessity to provide a circuit external to the synchronizing loop circuit in order to perform reverse-spread of the received signal.

Accordingly, with this constitution of this embodiment it is possible to restore the information signals by primary demodulation of the reverse-spread signals in the primary demodulation portion 24. The amplitude level of the reverse-spread signal is taken by an absolute value circuit 23, and is smoothed alternating of the amplitude. Therefore, the reverse-spread signal enables usage of the gain control circuit 21 as the control signal.

Tenth Embodiment

Figure 14:
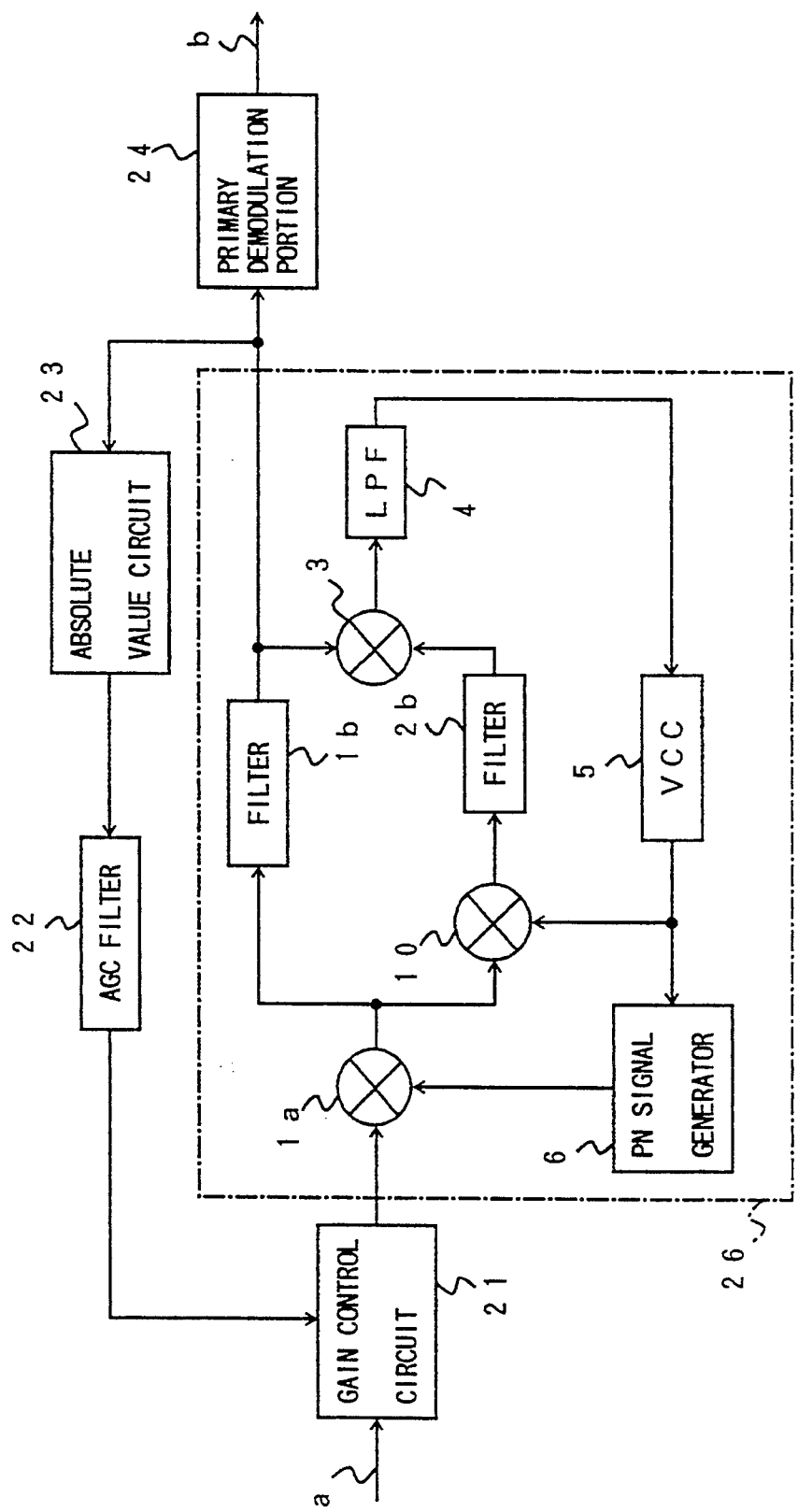
FIG. 14 is a view of the output of the PN signal synchronizing circuit in a spread spectrum communications system of a tenth embodiment according to the present invention being applied to a gain control circuit.

The same operation as used in the ninth embodiment can be applied to the synchronizing loop of the third embodiment shown in FIG. 7. There are several methods of constituting this synchronizing loop circuit by changing the order and position of multiplication of the received signal, the PN signal and the clock signal, but in the present embodiment, the circuit of configuration shown in FIG. 14 is used as one example. The configuration of the synchronizing loop circuit 26 differs from that shown in FIG. 13. The PN signals generated by a normally used PN signal generator are of the NRZ code and so here the coding format will be omitted and reference made simply to "PN signal" and a "PN signal generator 6". A correlator is constituted from a combination of a multiplier 1a and a band pass filter 1b and obtains a correlation between the PN signal and the received signal. Furthermore, a correlator is constituted from multipliers 1a, 10 and a filter 2b, and takes the correlation between the received signal, the PN signal and the clock signal.

This embodiment can also be realized by multiplying the local oscillation signals for dropping to intermediate frequency the output for the NRZ code from the PN signal generator 6.

The following is a description of the operation.

Inside the synchronizing loop circuit 26, the correlator constituted by combining the multiplier 1a and the band pass filter 1b produces the correlation between the PN signal and the received signal. Accordingly, the output of the band pass filter 1b produces the same output as that of the correlator 1 of FIG. 13.

The other correlation value is the correlation value between the received signal and the PN signal of the Manchester code in FIG. 13, and the signal obtained by multiplying the PN signal of the NRZ code and clock signal is the same as the PN signal of the Manchester code. Therefore, a correlation value is obtained by multiplication with the clock signal after the received signal has been multiplied with the PN signal of the NRZ code. This correlation value is the same as the correlation value taken for the received signal and the PN signal of the Manchester code. Accordingly, a correlation value between the received signal, the PN signal and the clock signal is correlated by the multipliers 1a, 10 and the filter 2b and that output with respect to that phase difference is the same as the output of the correlator 2 of FIG. 13. Accordingly, the operation after this is the same as the operation of the configuration of FIG. 13 and PN signal synchronizing is held.

Here also, the output of the band pass filter 1b becomes a reverse-spread signal and so the output signal of the band pass filter 1b can be demodulated into an information signal by the primary demodulation portion 24. Furthermore, the amplitude level of these output signals can be taken by the absolute value circuit 23 and fluctuations in the amplitude may be smoothed by the AGC filter 22 to enable these signals to be used as gain control signals.

Elevehth Embodiment

Figure 15:
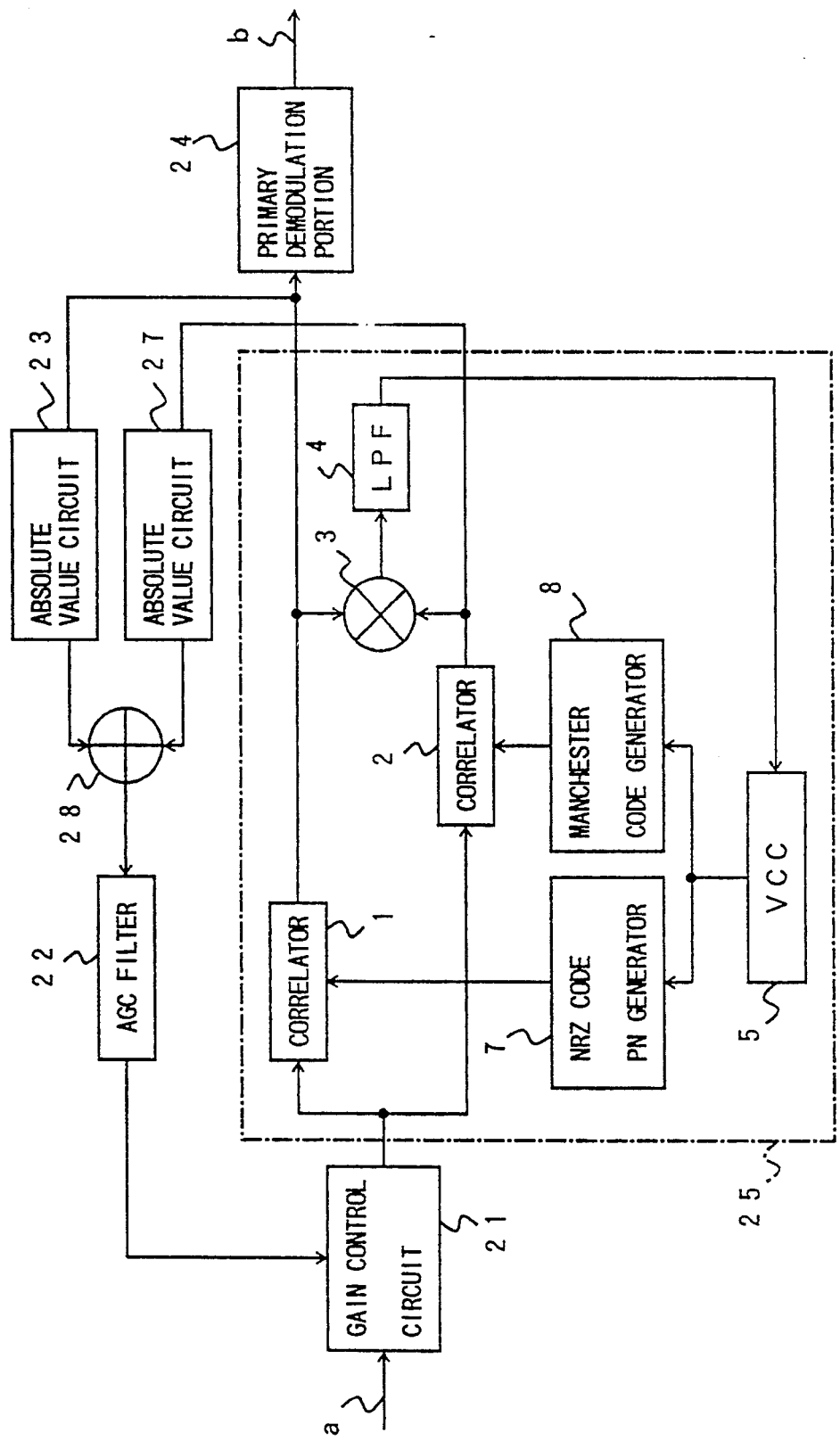
FIG. 15 is a view of the output of the PN signal synchronizing circuit in a spread spectrum communications system of an eleventh embodiment according to the present invention being applied to a gain control circuit.

FIG. 15 is a view of the output of the PN signal synchronizing circuit in a spread spectrum communications system of a eleventh embodiment according to the present invention being applied to a gain control circuit. This embodiment is that for reinforcement against jitter in the PN signal. This configuration of the embodiment is enhanced by adding an absolute value circuit 27 and an adder 28 to the gain control circuit of the ninth embodiment shown in FIG. 13.

When reverse-spread signals are conventionally used as they are for gain control, the characteristics with respect to phase difference of the control signals has an extremely sharp characteristic, as shown in FIG. 3 (A). Accordingly, the output with respect to small discrepancies in the PN signal becomes extremely sharp. Because of this, the output of the gain control circuit fluctuates largely and adversely influences the synchronizing tracking.

Figure 16:
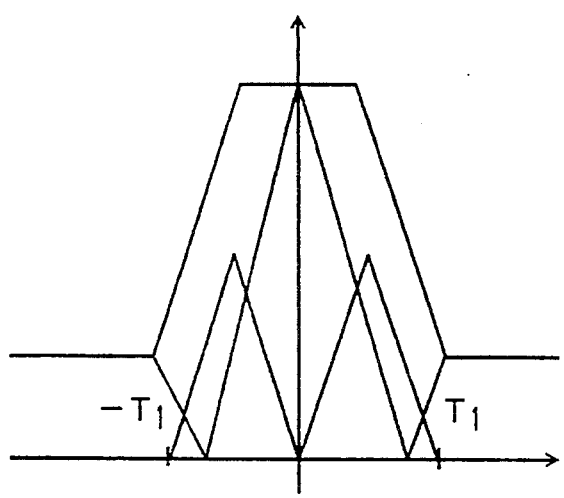
FIG. 16 shows an output of correlators of the present invention.

One of the outputs of the two correlators has the characteristic shown in FIG. 3 (A) while the other has the characteristic shown in FIG. 3 (C). Accordingly, as shown in FIG. 16, the summary of the absolute values of the two correlators exhibits a characteristic which is smooth with respect to phase displacements of from $-\frac{1}{2}$ cycle to $+\frac{1}{2}$ cycle. Of course, it is possible to obtain a smooth characteristic by either amplifying or attenuating either of the correlation values.

Accordingly, if the jitter of the PN signals is within $\pm\frac{1}{2}$ cycle, there will not be large fluctuations in the control signals and so the gain control circuit will no longer adversely affect the synchronizing-tracking.

Twelfth Embodiment

Figure 17:
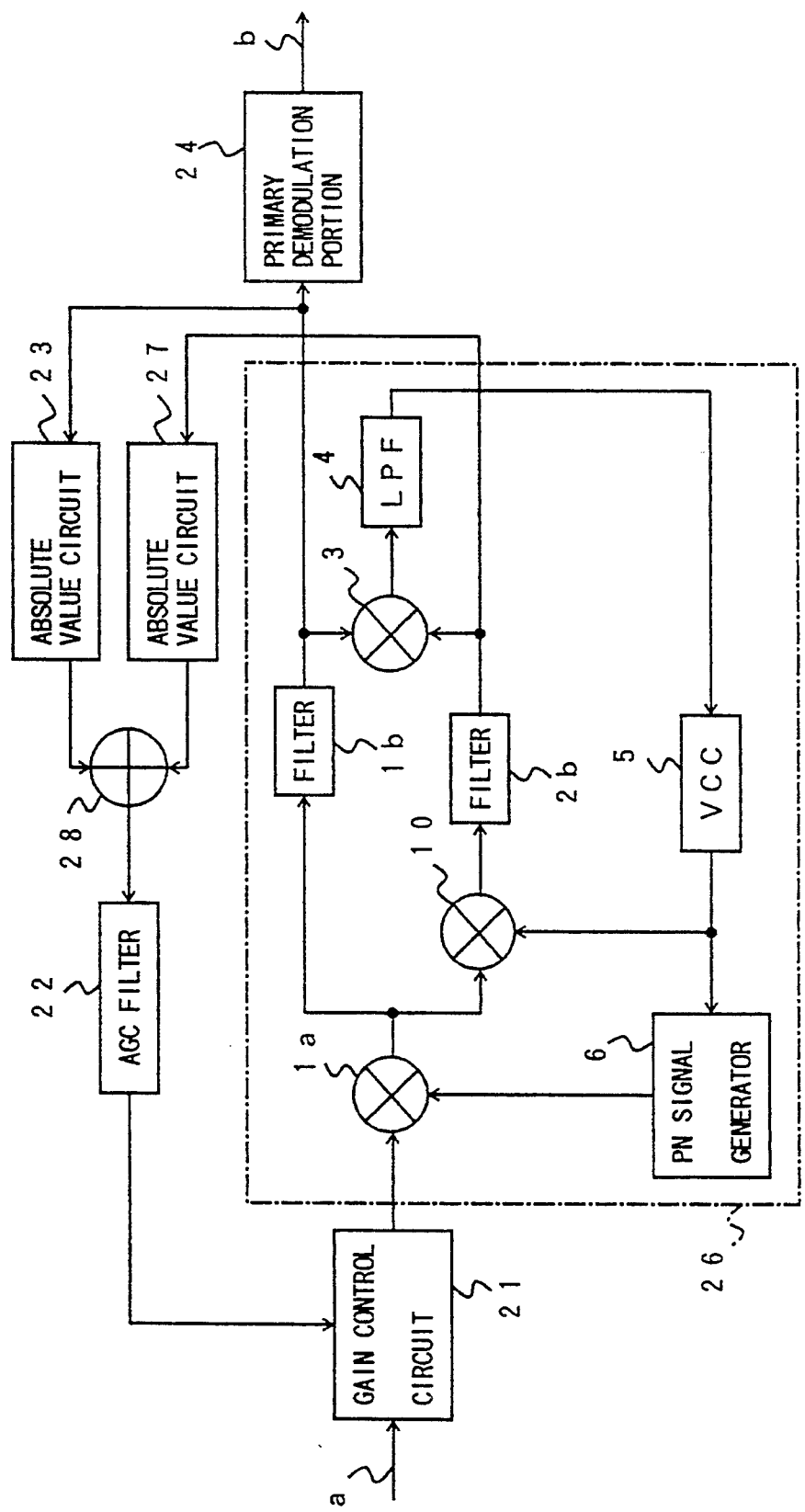
FIG. 17 is a view of the output of the PN signal synchronizing circuit in a spread spectrum communications system of a twelfth embodiment according to the present invention being applied to a gain control circuit.

FIG. 17 is a view of the output of the PN signal synchronizing circuit in a spread spectrum communications system of a twelfth embodiment according to the present invention being applied to a gain control method. This embodiment is for the gain control method of the tenth embodiment shown in FIG. 19, to which an absolute value circuit 27 and an adder have been added to the synchronizing loop circuit 26.

The circuit shown in the figure inputs the correlated signals of the band pass filter 1b of the synchronizing loop circuit 26, to the absolute value circuit 23 and inputs the correlated signals of the filter 2b to the absolute value circuit 27, adds the outputs of the absolute value circuits 23 and 27 in the adder 28, and inputs the addition result to the AGC filter. This configuration achieves the same result as the tenth embodiment.

Thirteenth Embodiment

Figure 18:
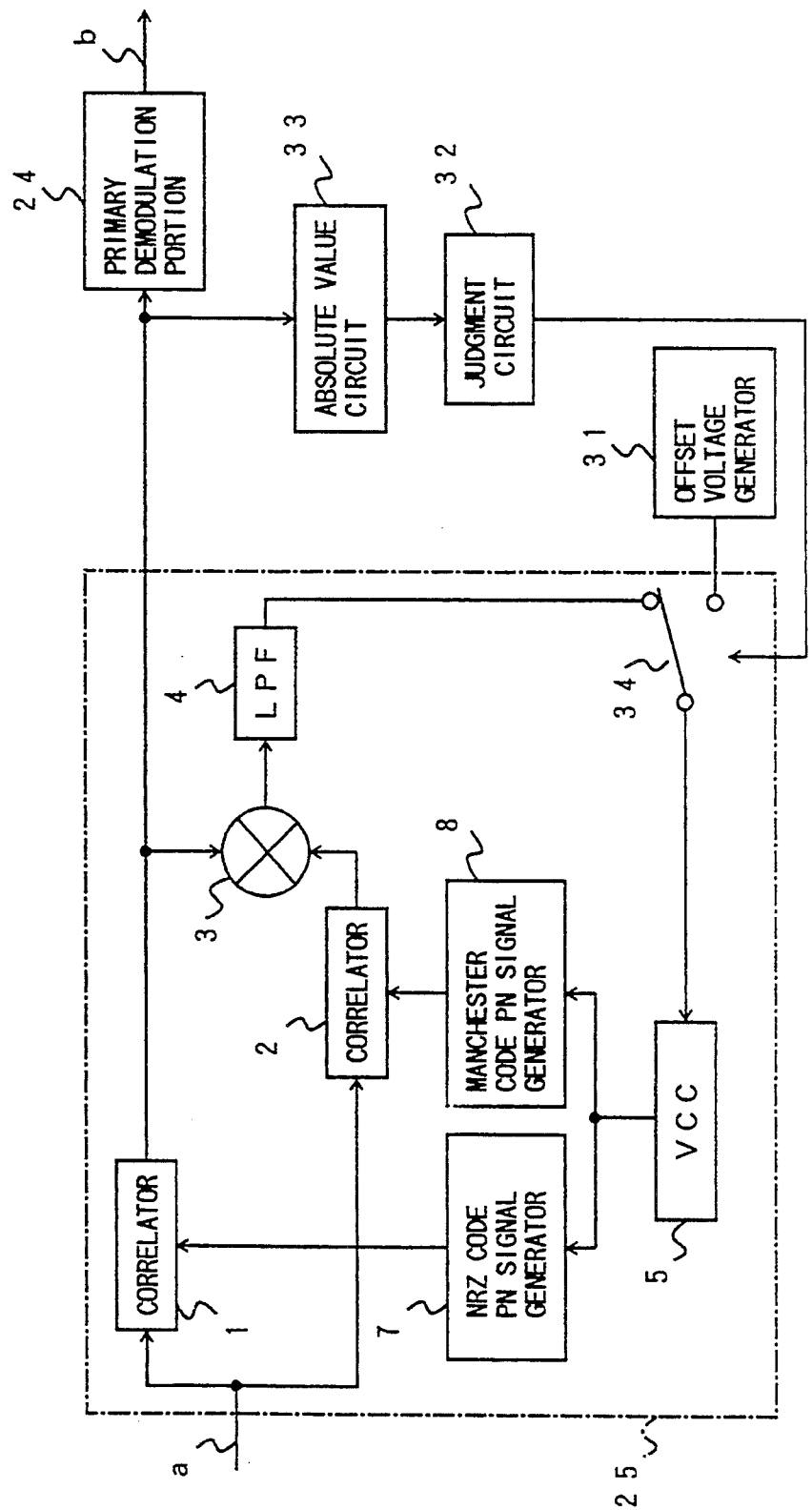
FIG. 18 is a view of the output of the PN signal synchronizing circuit in a spread spectrum communications system of a thirteenth embodiment according to the present invention being applied to a synchronizing judgment circuit.

FIG. 18 is a view of the output of the PN signal synchronizing circuit in a spread spectrum communications system of a thirteenth embodiment according to the present invention being applied to a gain control method. The figure shows a configuration where the synchronizing circuit 25 of FIG. 13 uses the correlation output from the correlator 1 for synchronizing judgment. An absolute value circuit 33 takes the amplitude level of the reverse-spread signals from the synchronizing circuit 25. The identification judgment circuit 32 generates control signals with respect to the reverse-spread signals of a certain level or less.

A switch circuit 34 uses the control signals from the identification judgment circuit 32 to switch between phase difference signals from the low-pass filter 4 and an offset voltage from the offset voltage generator 31.

The following is a description of the operation.

When there is initial synchronizing of the PN signals or when there is synchronizing step-out of the PN signal and the received signal, the synchronizing circuit 25 does not perform synchronous tracking with respect to the phase difference of the PN signals outside a range of $\pm 1$ cycle. Accordingly, the PN signals must be slid and the synchronizing point searched.

When the synchronizing loop is not synchronizing status, there is no longer any output from the correlator 1. Accordingly, the absolute value circuit 33 takes the amplitude level of the reverse-spread signals and when that level is a predetermined value or less, the identification judgment circuit 32 judges that there occurs synchronizing step-out, and generates a control signal. This control signal is used by the switch 34 to switch and for the signal which controls the clock speed of the VCC 5 to be switched from the output of the LPF 4 to the output of the offset voltage generator 31. The offset voltage from the offset voltage generator 31 causes the VCC 5 to output a constant clock signal which encourages PN signal shifting.

When the PN signal has been slid and the synchronizing point found, the correlator 1 outputs a signal which stops the control signal from the identification judgment circuit 32 so that the switch 34 again switches to the side of the LPF 4 with synchronous tracking being performed thereafter. Moreover, the identification judgment circuit 32 can be thought of as operating so that the gain control shown in FIG. 13~FIG. 17 is held at a predetermined value when a synchronizing step out is determined.

Fourteenth Embodiment

Figure 19:
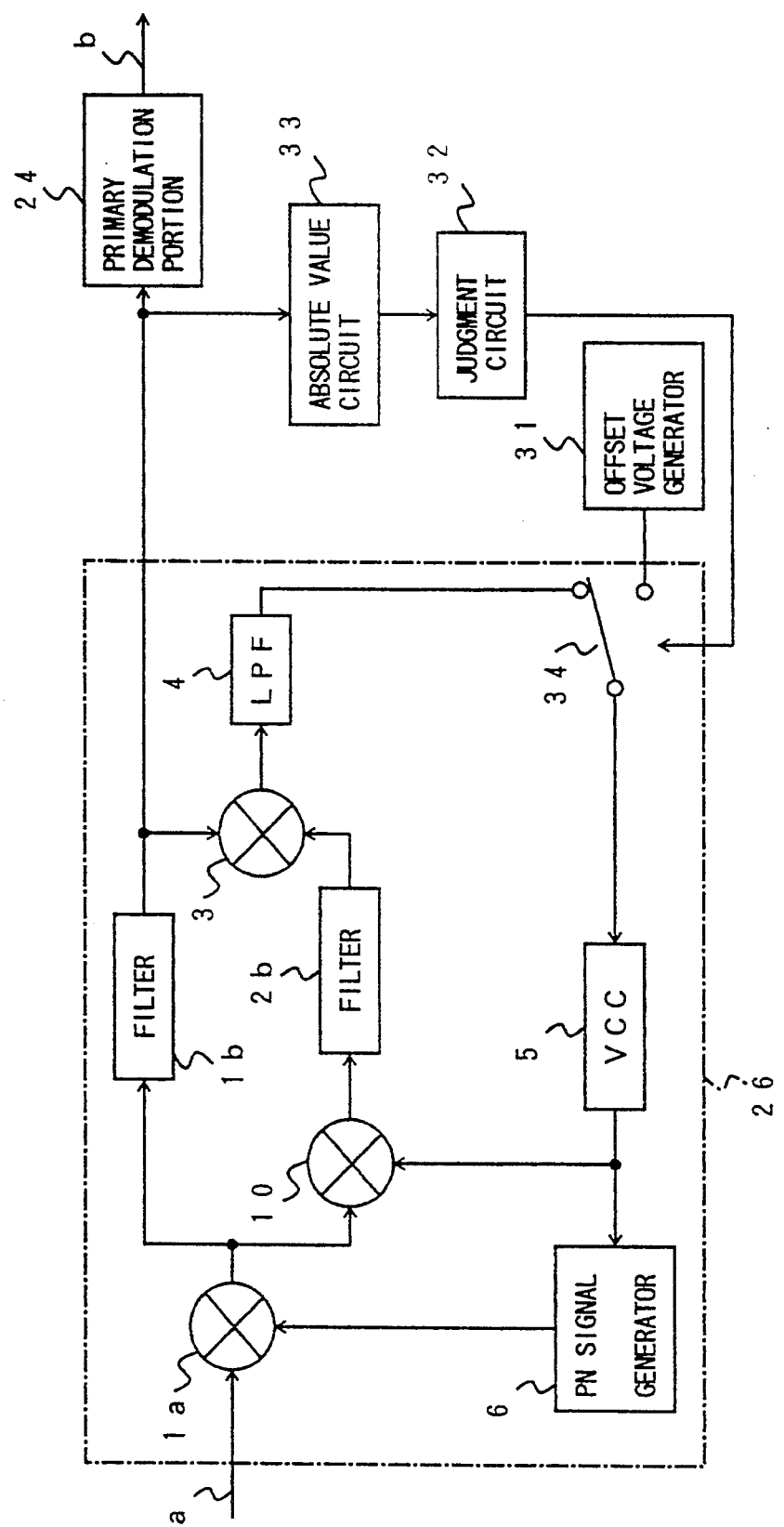
FIG. 19 is a view of the output of the PN signal synchronizing circuit in a spread spectrum communications system of a fourteenth embodiment according to the present invention being applied to a synchronizing judgment circuit.

FIG. 19 is a view of the output of the PN signal synchronizing circuit in a spread spectrum communications system of a fourteenth embodiment according to the present invention being applied to a gain control method. The figure shows an example of a configuration which synchronizing judgment uses the correlation output from the band pass filter lb of the synchronizing loop circuit 26 shown in FIG. 14. The configuration of this embodiment also has the same effects as the thirteenth embodiment.

Fifteenth Embodiment

Figure 20:
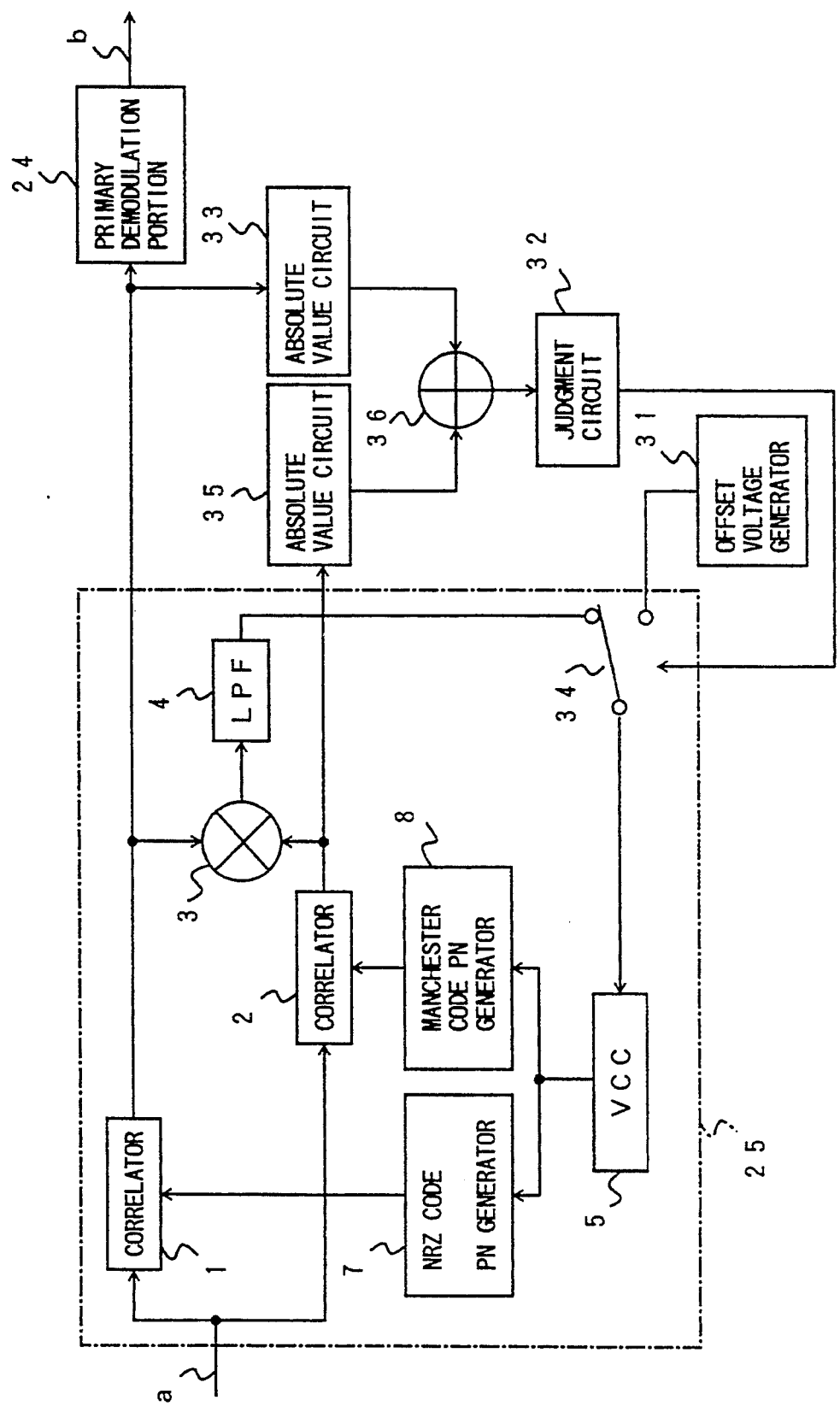
FIG. 20 is a view of the output of the PN signal synchronizing circuit in a spread spectrum communications system of a fifteenth embodiment according to the present invention being applied to a synchronizing judgment circuit.

FIG. 20 is a view of configuration of the synchronizing judging circuit using the output of the PN signal synchronizing circuit in a spread spectrum communications system of a fifteenth embodiment according to the present invention being applied to a gain control method.

The configuration shown in the figure is the configuration of the thirteenth embodiment of FIG.13, to which an absolute value circuit 35 and an adder 36 have been added. The correlation characteristic is sharp as it is for gain control and so the correlation output becomes almost zero due to jitter of the PN signals and there are cases where it is erroneously judged that there is synchronizing step out. Accordingly, in the same manner as in the eleventh embodiment shown in FIG. 15 and in the twelfth embodiment shown in FIG. 17, judging the synchronizing status by the sum of the absolute values of two correlation outputs enables the performance of synchronizing judgment which is more resistant to jitter in the PN signals. The configuration shown in the figure produces the same effects as the fourteenth embodiment.

Sixteenth Embodiment

Figure 21:
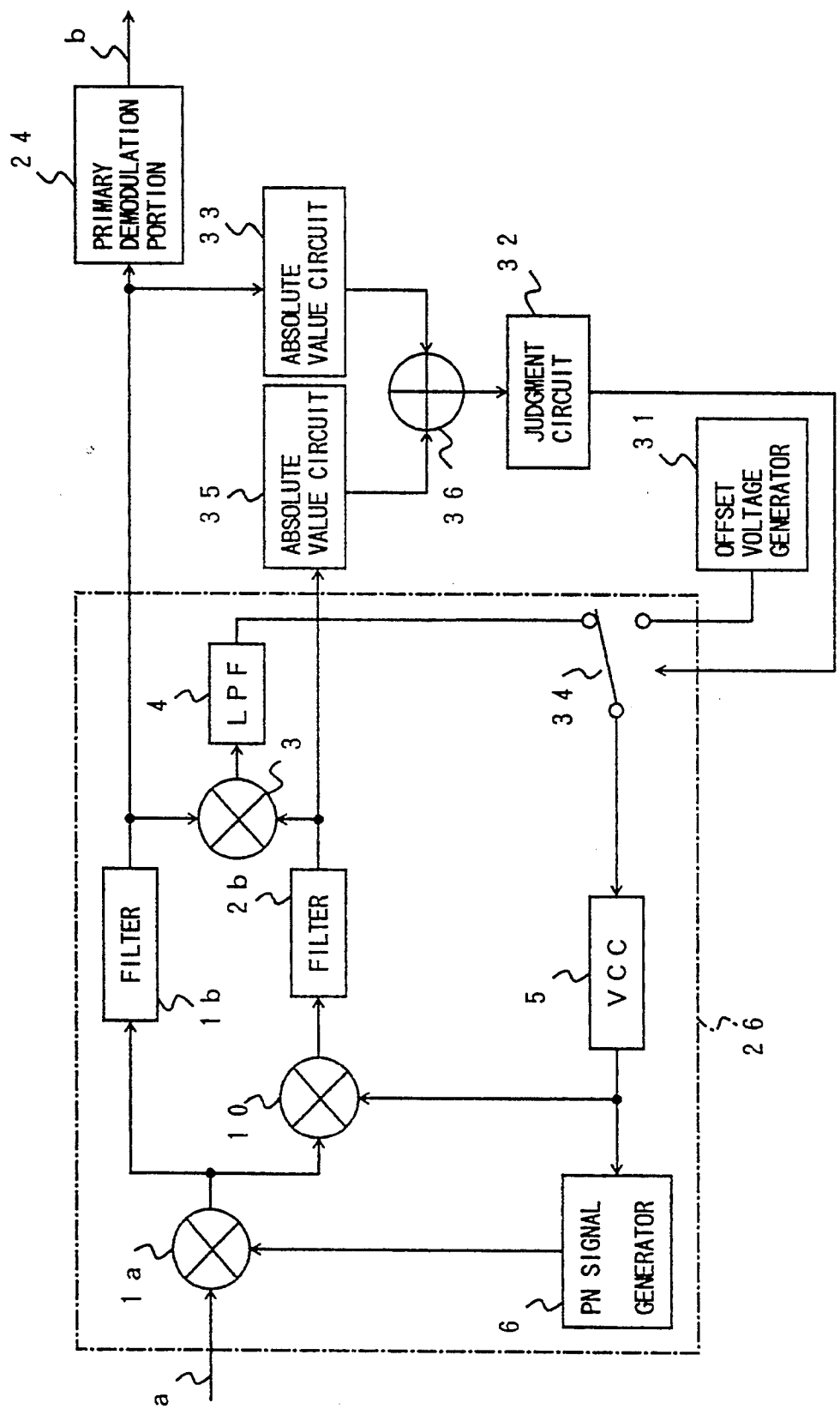
FIG. 21 is a view of the output of the PN signal synchronizing circuit in a spread spectrum communications system of a sixteenth embodiment according to the present invention being applied to a synchronizing judgment circuit.

FIG. 21 is a view of the synchronizing judging circuit using the output of the PN signal synchronizing circuit in a spread spectrum communications system of a sixteenth embodiment according to the present invention being applied to a gain control method. The configuration shown in the figure is the configuration of FIG. 19, to which an absolute value circuit 35 and an adder 36 have been added. In the case of this configuration, the output of the filter 2b is input to the absolute value circuit 35, the adder 36 adds the outputs of the absolute value circuit 33 and the absolute value circuit 35 and inputs the result to the identification judgment circuit 32.

Seventeenth Embodiment

The embodiments of the present invention described below are proposed modifications of the second, third and fifth embodiments shown in FIGS. 5, 7, 8 and 9, but where the embodiments of FIGS. 5, 7, 8 and 9 and the sixth through eighth embodiments of FIGS. 10, 11 and 12 spread by PN signals of the NRZ code on the transmission side, the embodiments described below with reference to FIGS. 22, 23 and spread by the Manchester code on the transmission side, and take the correlation output of the received signal and the PN signal of the Manchester code as reverse-spread in a PN signal synchronizing loop.

These embodiments provide details of the third pattern mentioned with respect to the first embodiment.

Figure 23:
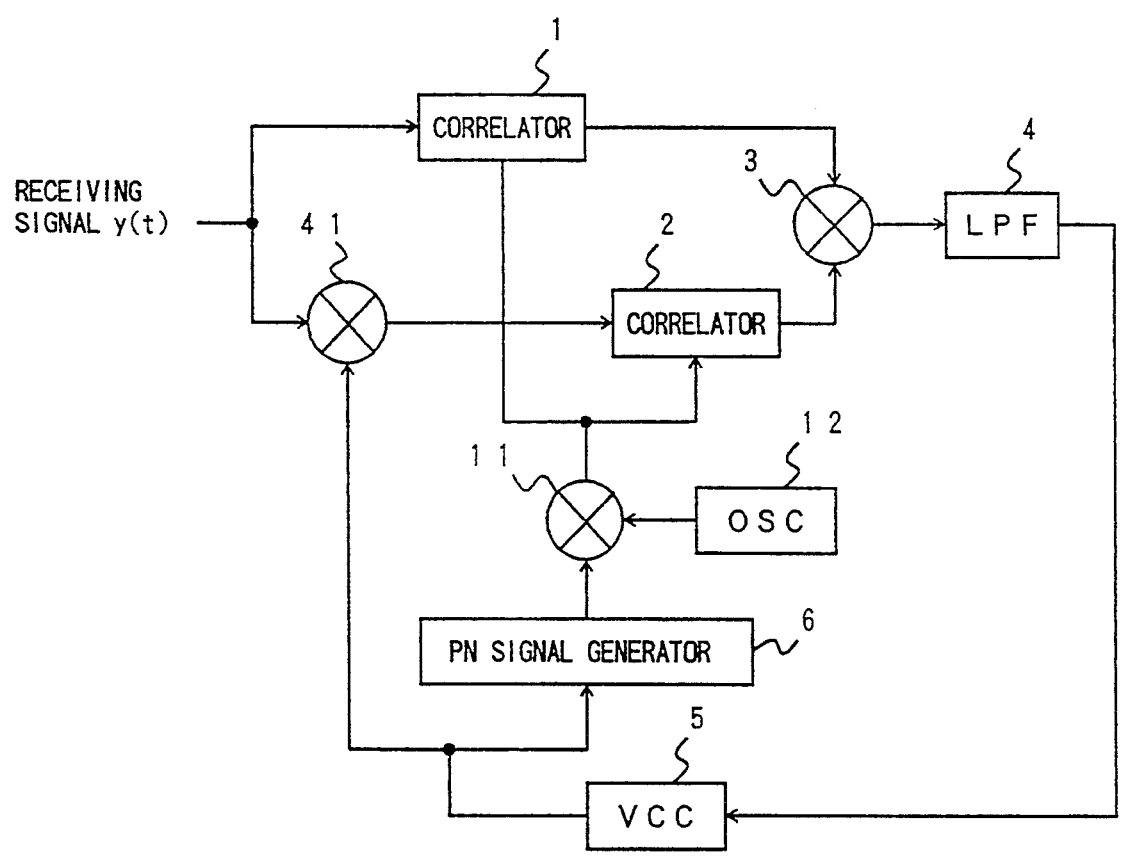
FIG. 23 is a view of a PN signal synchronizing circuit using a Manchester code of a eighteenth embodiment according to the present invention.

FIG. 23 is a view of a PN signal synchronizing circuit using the Manchester code of an eighteenth embodiment according to the present invention. The configuration shown in the figure has a multiplier 41 added to the circuit of the first embodiment shown in FIG. 4. In FIG. 23, Those portions which correspond to portions of FIG. 4 are indicated with corresponding numerals. The VCC 5 uses the control signals to change the clock cycle. The PN signal generator 6 generates PN signals of the NRZ code. Normally, PN signals of an M-sequence code are used as the PN signals.

The multiplier 41 functions to multiply the received signal y(t) and the clock signal from the VCC 5. The correlator 1 outputs the correlation $y_{c1}(t, \Delta t)$ for the received signal y(t), the clock signal and the PN signal, while the correlator 2 outputs the correlation value $y_{c2}(t, \Delta t)$ for the received signal, the clock signal and the PN signal. The multiplier 3 obtains the product of the outputs of the two correlators, the band pass filter 4 passes only the low-frequency component of the output of the multiplier 3 and outputs it as the control signal "$\epsilon(\Delta t)$" to the VCC 5.

The following is a description of the operation.

The received signal y(t) is expressed by the following equation.

$$y(t) = d(t) P'_N(t) \cos(\Omega_C + \theta) \quad (16)$$

However, d(t) here is a data signal, and is expressed as one of the two logical values of "1" and "−1". In addition, "$P_N'(t)$" is a PN signal included in the received signals, and the PN signals generated by the PN signal generator 6 are PN signals of the NRZ code of the same series. "$\omega_c$ is the angular velocity of the carrier, and "$\theta$" is an arbitrary phase of the carrier.

The PN signal generated by the PN signal generator are expressed by "$P_N(t+\Delta t)$" where, "$\Delta t$" is the phase difference between the PN signal. generated by the PN signal generator and the PN signal $PN_N'(t)$ in the received signal.

The received signal y(t) is divided into signals, and the correlator 1 multiplies one signal with the PN signal ($t+\Delta t$) and then takes a correlation between the product and the PN signal $P_N(t+\Delta t)$.

These correlators 1, 2 are normally constituted from multipliers which multiply the two signals, and band pass filters which have band widths which pass only the data signal d(t) in the carrier band. If the output of the correlator 1 expressed as $y_{c1}(t, \Delta t)$, then $y_{c1}(t, \Delta t)$ can be expressed by the following equation (17).

$$i\, y_{C1}(t,) = d(t) R_{NN}(\Delta t) \cos(\omega_c + \theta) \quad (17)$$

where, $RR_{NN}(\Delta t)$ is expressed by the following equation (18).

$$R_{NN}(\Delta t) = \overline{P_N(t)P_N(t+\Delta t)} \qquad (18)$$

The line in equation (18) indicates that the low-frequency component is taken.

In the same manner, if the output of the correlator 2 is expressed as $y_{c2}(t, \Delta t)$, then $y_{c2}(t, \Delta t)$ can be expressed as per the the following equation (19).

$$y_{c2}(t,\Delta t) = d(t)R_{NM}(\Delta t) \cos(\omega_c t + \theta) \qquad (19)$$

Where, $R_{NM}(\Delta t)$ is expressed as per the following equation (20).

$$R_{NM}(\Delta t) = \overline{P_N(t)c(t+\Delta t)P_N(t+\Delta t)} \qquad (20)$$

The correlation value $R_{NM}(\Delta t)$ in equation (20) is the PN signal of the the NRZ code of the same series and so it has the characteristics shogun in FIG. 3 (A).

The clock signal $c(t+\Delta t)$ and the PN signal of the NRZ code $P_N(t+\Delta t)$ are multiplied in equation (20), but is clock signal and the PN signal of the NRZ code become the PN signal of the Manchester code when they are multiplied and so the correlation value $R_{NM}(\Delta t)$ is a correlation between the PN signal of the NRZ code and the PN signal of the Manchester code and so it has characteristics shown in FIG. 3 (C).

These outputs $Y_{c1}(t,\Delta t)$ and $Y_{c2}(t,\Delta t)$ of the two correlators are multiplied by the multiplier 3, and only the low-frequency component of the product thereof is passed through the LPF 4. If this signal is labeled $\epsilon(\Delta t)$ then $\epsilon(\Delta t)$ is given by the following equation (21).

$$\epsilon(\Delta t) = \overline{y_{c1}(t,\Delta t)y_{c2}(t,\Delta t)} = \frac{1}{2} R_{NN}(\Delta t)R_{NM}(\Delta t) \qquad (21)$$

Where "$\epsilon(\Delta t)$" is a function of only the phase difference $\Delta t$ of the PN signal. This characteristic is shown in FIG. 3. Accordingly, this can be fed back as a control signal used for the VCC 5 to realize PN signal synchronizing.

In addition, when there is synchronizing of the phase of the PN signal by this synchronizing loop, $\Delta t = 0$ and so $R_{NN}(\Delta t)$ takes the peak value $A_{NN}$ at $\Delta t = 0$ in FIG. 3 (A), and thereby, the output of the correlator 1 may be expressed by the following equation.

$$y_{c1}(t, 0)A_{NN}d(t) \cos(\omega_c t + \theta) \qquad (17)'$$

Eighteenth Embodiment

FIG. 23 is a view of a PN signal synchronizing circuit using the manchester code of an eighteenth embodiment of the present invention. In the figure, a multiplier 11 and an OSC 12 are added to the PN signal synchronizing circuit of FIG. 22. In addition, the band pass filter used in the correlator 1 and the correlator 2 is a filter which passes the frequency band of the difference between the frequency of the carrier and the frequency of the oscillation signal of the OSC 12.

The following is a description of the operation.

In the seventeenth embodiment shown in FIG. 22 processing is performed without changing the frequency of the carrier but the later processing is facilitated if the frequency of the carrier is changed to an intermediate frequency. Accordingly, input to the correlators 1, 2 of signals which are the PN signal generated from the PN signal generator 6 and placed on the local oscillation signal of the OSC 12 enables performance of the correlation with the PN signal to be taken and also enables conversion thereof to an intermediate frequency.

Nineteenth Embodiment

Figure 24:
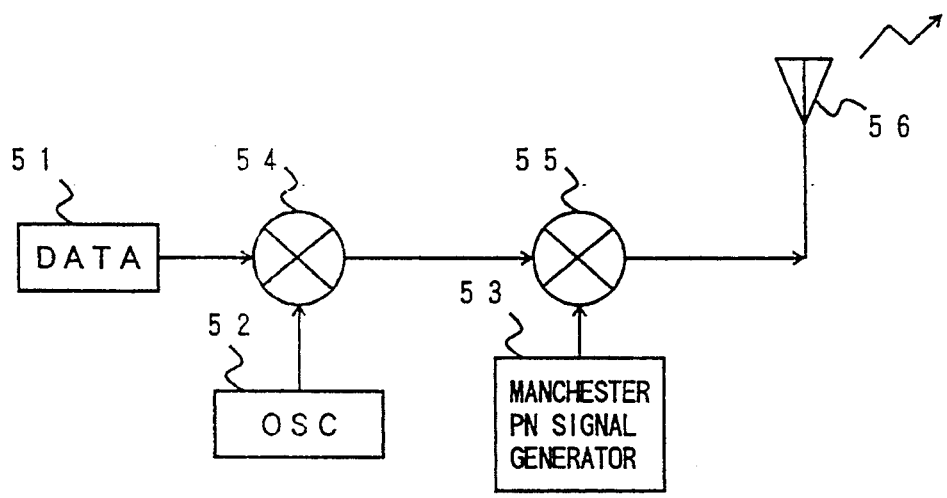
FIG. 24 (A) shows a transmission system for the PN signal synchronizing circuit using a Manchester code of a nineteenth embodiment according to the present invention.
Figure 24:
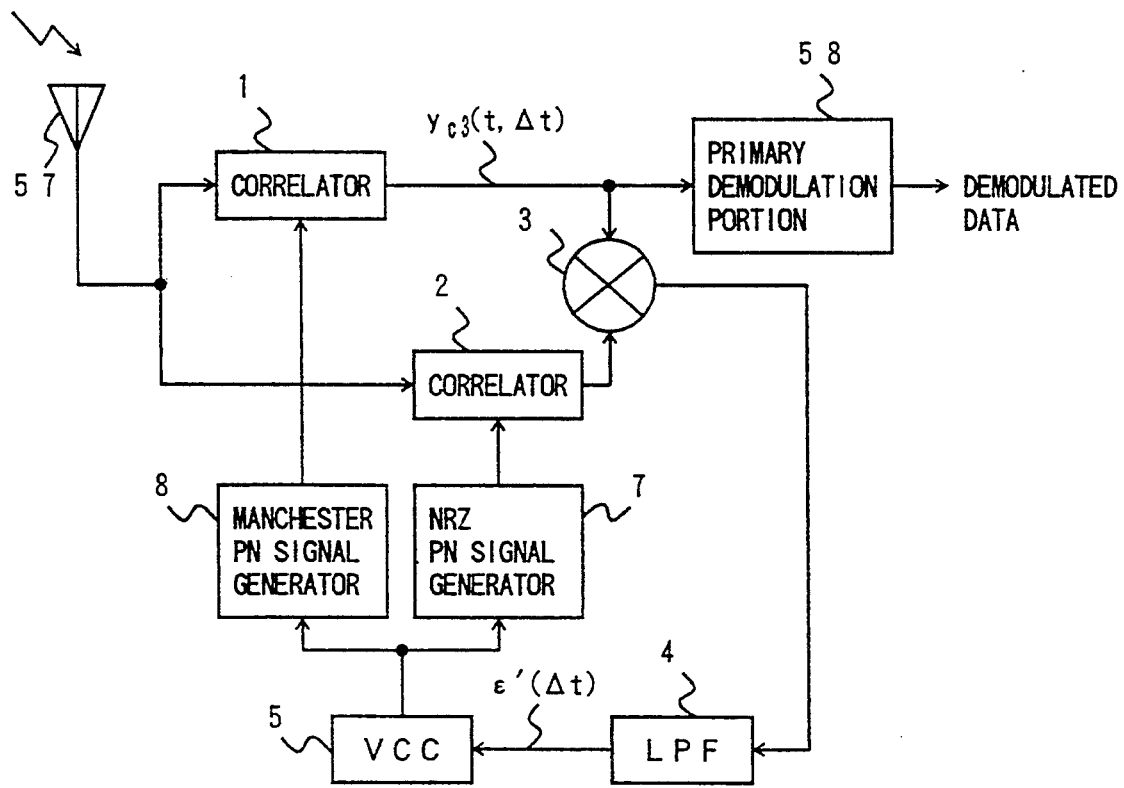

FIG. 24(A) and FIG. 24(B) show a PN signal synchronizing circuit using the Manchester code of a nineteenth embodiment of the present invention. FIG. 24(A) shows the transmission system, while FIG. 24(B) shows the receiving system. The transmission system of FIG. 24(A) is constituted from a Manchester code PN signal generator 53, multipliers 54, 55 and a transmission antenna 56. The reception system of FIG. 24 (B) is constituted from a receiving antenna 57, correlators 1, 2 a multiplier 3, a Manchester code PN signal generator 8, an NRZ code PN signal generator 7, a VCC 5, a LPF 4 and a primary demodulator 58.

In addition, the synchronizing loop of the reception system in FIG. 24(B) is the same as that for the second embodiment shown in FIG. 5.

The following is a description of the operation.

The difference between the nineteenth embodiment and the second embodiment shown in FIG. 5 is that in the transmission system, the PN signals of the Manchester code are used instead of the PN signals of the NRZ code in the spread signals.

Figure 3B:
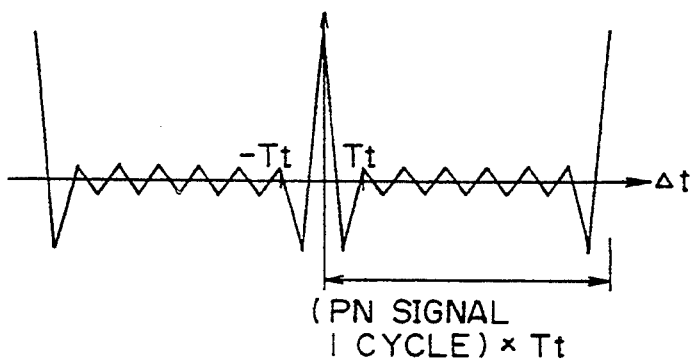
Figure 3C:
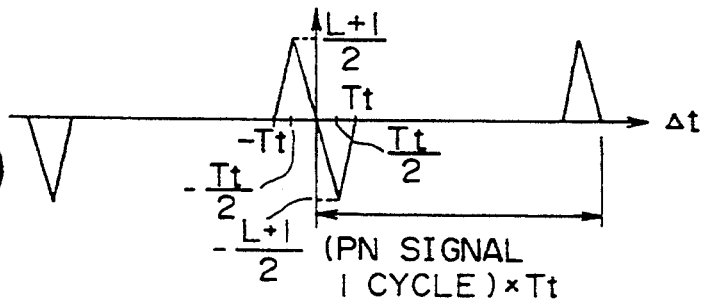

In the synchronizing loop of the receive system, the correlation between the PN signals of the NRZ code generated by the receive system has the characteristic shown in FIG. 3(C), and the correlation with the PN signal of the Manchester code by the receive system is a correlation of the Manchester coded pairs and therefore has the characteristic show in FIG. 3(B). If this correlation of the Manchester coded pairs is labeled as $R_{MM}(\Delta t)$, then the phase error signal "$\epsilon(\Delta t)$" is expressed by the following equation (22).

$$\epsilon'(\Delta t) = \tfrac{1}{2} R_{MM}(\Delta t)R_{NM}(\Delta t) \qquad (22)$$

FIG. 6(B) shows the characteristic with respect to the phase difference "$\Delta t$" of the PN signal which has been multiplied with the correlation value $R_{NM}(\Delta t)$ of the NRZ and the Manchester code, and with the correlation value $R_{NM}$ of these Manchester coded pairs. As can be seen from this graph, the slope in the vicinity of the origin is larger than the slope in the vicinity of the origin of the graph in FIG. 6(A), and so this represents the sensitivity characteristic with respect to the phase difference "$\Delta t$". Accordingly, feed back of the sensitivity characteristic as a control signal for the VCC enables synchronizing of PN signals to be realized.

In addition, when synchronization is effected as this invention, the correlation value of the Manchester code pairs takes a predetermined value $A_{MM}$. Accordingly, if the output signals of the correlator 1 is $y_{c3}(t,\Delta t)$, then it can be expressed as follows.

$$y_{c3}(t, 0) = A_{MM}d(t) \cos(\omega_c t + \theta) \qquad (23)$$

It is possible to use these output signals as reverse-spread signals.

Twentieth Embodiment

Figure 25:
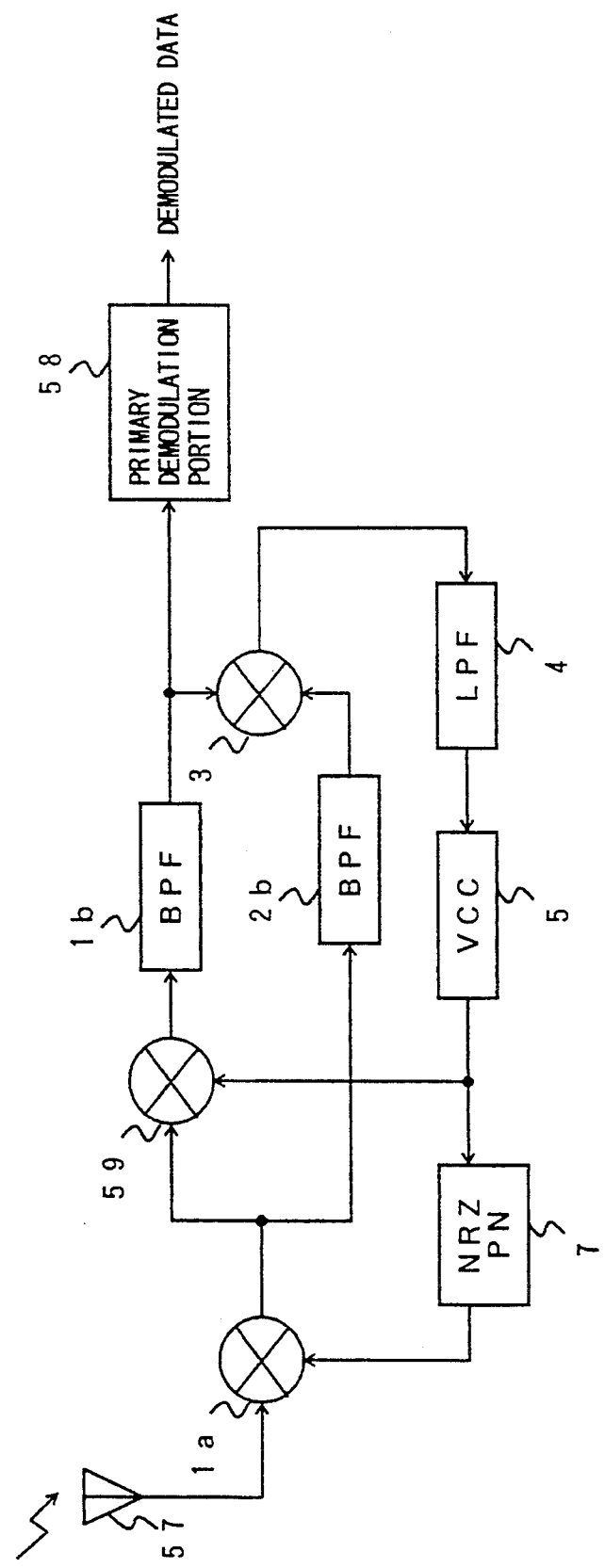
FIG. 25 shows a PN signal synchronizing circuit of a twentieth embodiment according to the present invention.

FIG. 25 shows a PN signal synchronizing circuit of a twentieth embodiment according to the present invention. The transmission system is the same as that for the embodiment shown in FIG. 24(A) and so only the receiving system is shown.

This embodiment is the same as the embodiment shown in FIG. 24 but can be applied to the third embodiment described with reference to FIG. 7. The correlation between the received signals, the clock signal and the PN signal of the NRZ code is the same as the correlation output $R_{MM}(\Delta t)$ of the Manchester code pair and so the phase error signal with respect to the phase difference "$\Delta t$" for the PN signal ultimately becomes the characteristic shown in FIG. 6(B) and also, it is possible for the signal of the correlation between the received signal, the clock signal and the PN signal of the NRZ code to be used as a reversespread signal.

Twenth-First Embodiment

The preceding description has been for the operation of the synchronizing loop. The following is a description on embodiments which exhibit the optimum value for a band pass filter in a synchronizing loop.

A spread spectrum communications method using the direct sequence (DS) method, for obtaining the correlation between the received signal and reference PN signal in order to obtain synchronizing detects the phase error of the receive PN signal and the reference PN signal. When a circuit is realized to obtain the correlation of the two signals, a correlator is normally constituted by a multiplier and a band-pass filter. In the bandpass filter of the correlator, much noise occurs in the passed received signal if the normal bandwidth is too wide, resulting in an adverse influence to the PN signal synchronizing tracking. In addition, conversely, if the normal bandwidth of the band-pass filter is too narrow, data modulation occurs for the received signals, only a small correlation output is passed and this produces an adverse influence to the PN signal synchronizing tracking.

A first method to avoid this is to provide the optimum bandwidth to the bandpass filter of the correlator when the waveform in the baseband of the data signals is the NRZ code. In addition, a second method is to give the optimum bandwidth to the bandpass filter of the correlator when the waveform in the baseband of the data signal is a Manchester code. By doing this, it is possible to constitute a PN signal synchronizing loop which has good tracking characteristics.

The following is a description with reference to FIG. 4.

There are three methods of configuration, dependent upon the method of using the correlator 2 to take the correlation between the three signals of the received signal, the PN signal and the clock signal. These methods are described with reference to FIG. 5, FIG. 6 and FIG. 7 respectively. In FIG. 5, The multiplier 1*a* and the bandpass filter 1*b* correspond to the correlator 1 of FIG. 4, while the EX-OR circuit 9, the multiplier 2*a* and the filter 2*b* correspond to the correlator 2 of FIG. 4. In FIG. 5, the multiplier 1*a* and the bandpass filter 1*b* correspond to the correlator 1 and the multiplier 1*a* and the multiplier 41 correspond to the correlator 2. In FIG. 22, the multiplier 41 and the correlator 2 of FIG. 22 correspond to the correlator 2 of FIG. 4.

FIG. 2 shows a PN signal synchronizing circuit of a twenty first embodiment of the present invention.

Figure 26:
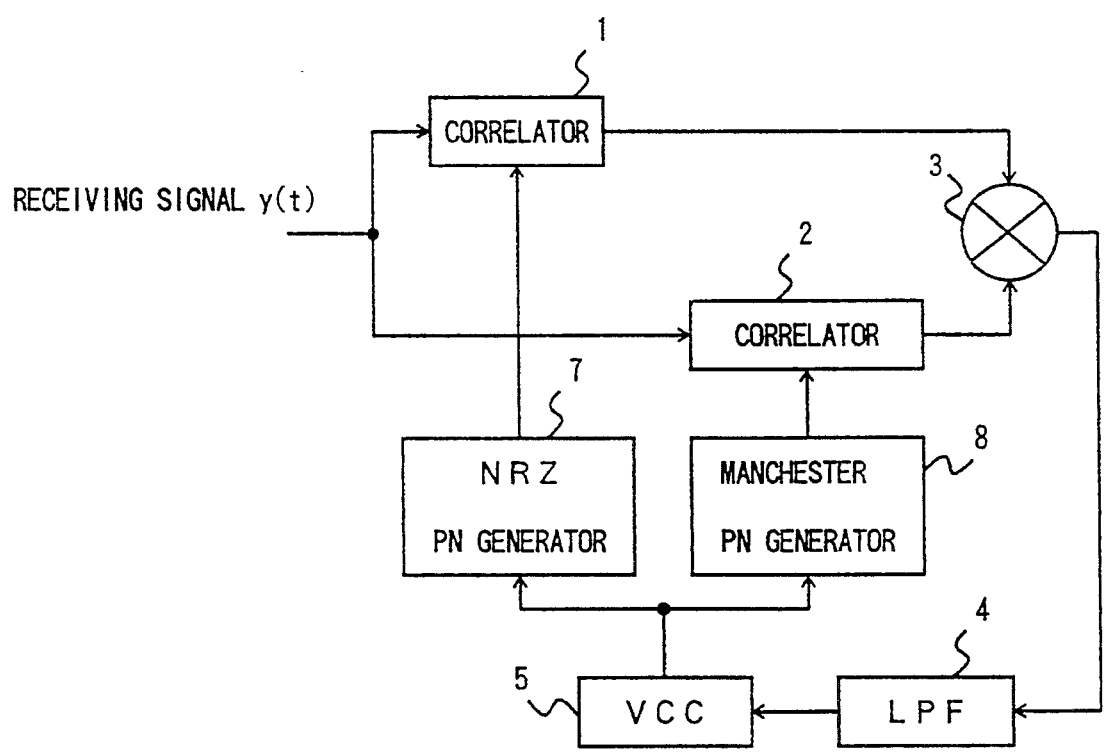
FIG. 26 shows a PN signal synchronizing circuit of a twenty first embodiment according to the present invention.

In this figure, the PN signal generator 6 of FIG. 5 can be regarded as a PN signal generator of the NRZ code 7 and the EX-OR circuit 9 and PN signal generator 6 can be regarded as the Manchester code PN signal generator 8; FIG. 26 and FIG. 5 handled in the same manner. Here, as shown in FIG. 2(A), the NRZ code is a format which allocates a positive voltage with respect to a logical value of 1, and a negative voltage with respect to a logical value of "0", while as shown in FIG. 2(B), the Manchester code is a coding format which allocates a status change from a negative voltage to a positive voltage to the logical value of "1", and allocates a status change from a positive voltage to a negative voltage to the logical value of "0".

These synchronizing loops all exhibit the same characteristics and so the description of the operation thereof will be made only with reference to FIG. 5. First, the received signal is labeled y(t) and thus y(t) may be expressed by the following equation (24).

$$y(t) = \sqrt{2K}\ D(t)P(t)\cos(\omega_0 + \phi) + n_c\cos(\omega_0 t + \phi) + \quad (24)$$

$$n_s\sin(\omega_0 + \phi)$$

Where
K: receiving power
D(t):data signal waveform
P(t):PN signal waveform
$\omega_0$:carrier angular velocity
$\Phi$:unknown carrier phase
$n_c$, $n_s$:Gauss noise (power density $N_j$)

The PN signal (reference PN signal) generated by the PN signal generator 6 is expressed as "$(t+\Delta t)$" and "$\Delta t$" corresponds to the phase error of the PN signals.

The received signal y(t) is multiplied with the reference of the PN signal by the multiplier 1*a* and pass the bandpass filter 1*b*. At this time, a correlation is taken between the reference of the PN signal and the PN signal in the received signal, and an output value, shown in FIG. 3 (A) with respect to the phase error "$\Delta t$", is calculated This output value is denoted by the correlation value "$R_{NN}(\Delta t)$". Accordingly, the correlation output $y_1(t, \Delta t)$ from the bandpass filter 1*b* is as per the following equation.

$$y_1(t) = \sqrt{2K}\ \tilde{D}(t)R_{NN}(\Delta t)\cos(\omega_0 t + \phi) + \tilde{N}_c\cos(\omega_0 t) + \quad (25)$$

$$\tilde{N}_s\sin(\omega_0 t + \phi)$$

Here, D(t) is the data signal waveform which has received a selected band of signals via the bandpass filter, and $\tilde{N}_c$ and $\tilde{N}_s$ are respectively, the noise $n_c$ and $n_s$ applied to the reference PN signals and are waveforms when the band limit is received.

The other correlation output from the bandpass filter 2*b* is output as follows. In the EX-OR circuit 9, the value between the reference PN signal P(t+$\Delta t$) and the clock signal C(t+t) are multiplied and this product is then multiplied with the received signal y(t) by the multiplier 2*a* and is passed through the bandpass filter 2*b*. However, the clock signal C(t) generates a 1-cycle PN signal for each cycle. The PN signal of the Manchester code is multiplied with the PN signal of the NRZ code and the clock signal. The correlation between the PN signal of the NRZ code and the PN signal of the Manchester code is known to take a value expressed as in FIG. 3(C). Because of this, the correlation value for the clock signal, the reference PN signal and the PN signal in the received signals and with respect to the phase error "Δt", takes a value expressed by FIG. 3(C). This output value is expressed by $R_{NM}$ (Δt). Accordingly, the correlation output $y_2(t, \Delta t)$ from the bandpass filter $2b$ is as per the following equation (26).

$$y_2(t) = \sqrt{2KD} \ (t)R_{NM}(\Delta t)\cos(\omega_0 t + \phi) + \tilde{N}_{co}\cos(\omega_0 t + \phi) + \tilde{N}_{so}\sin(\omega_0 t + \phi) \quad (26)$$

Here, $\tilde{N}_{co}$ and $\tilde{N}_{so}$ are the data signal wave form which noise $n_c$ and $n_s$ are respectively multiplied with the reference PN signal, and are applied respectively, a band limit by the bandpass filter $1b$, $2b$.

In the above, the two correlation outputs $y_1(t,\Delta t)$ and $y_2(t,\Delta t)$ are multiplied by the multiplier 3. The low-frequency component of this signal is used as the phase error signal $E(t,\Delta t)$. Accordingly, the phase error signal $E(t,\Delta t)$ is as in the following equation (27).

$$\begin{aligned} E(t,\Delta t) &= \overline{y_1(t)y_2(t)} \\ &= KD_m R_{NN}(\Delta t)R_{NM}(\Delta t) + \\ &\quad n(t,\Delta t) \end{aligned} \quad (27)$$

The line in the equation represents the taking of the low-frequency component of the corresponding product signal. In addition, $D_m$ is the described by following equation (28).

$$D_m = \tilde{D}^2(t+\Delta t) \quad (28)$$

This Dm expresses the power of the data signal which applies the band limit. Then, the data signal waveform D(t) is a value of ±1 and so square Dm thereof is not time dependent. In addition, n(t,Δt)there is the following equation (29).

$$E(t,\Delta ta) = \tilde{N}_{co}\ (t,\Delta t)\tilde{N}_c^0(t,\Delta t) + \tilde{N}_s(t,\Delta t)\tilde{N}_{so}(t,\Delta t) \quad (29)$$

Accordingly, in equation (27), the first item of E(t,Δt) is dependent on only the phase error "Δt", while the second item is an item expressing the noise, and so E(t,Δt) can be handled as a loop control signal. The according of the tracking characteristic of the synchronizing loop is expressed by the dispersion $\sigma^2$ of the phase error Δt. In particular, the dispersion $\sigma^2$ of this phase error "Δt" is divided by the S/N ratio for the loop bandwidth and this value is used as an index of according of the tracking characteristic of the synchronizing loop. This is called the square loss $S_L$ and is expressed by equation (30).

$$S_L = \frac{2KN_0 D_m^2}{\overline{N(0)}} \quad (30)$$

Where $\overline{N(0)}$ is the mean square of the power of the noise expressed by equation (29).

Figure 27:
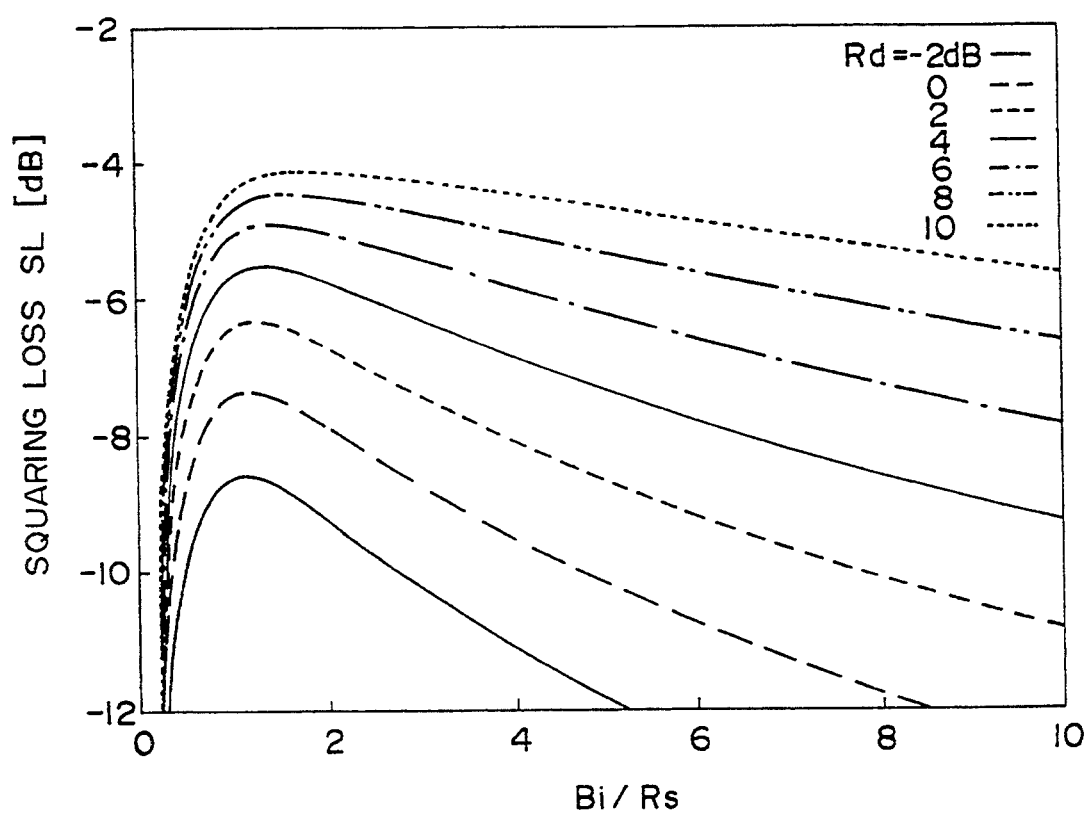
FIG. 27 shows the results of calculating the square loss for the present invention.
Figure 28:
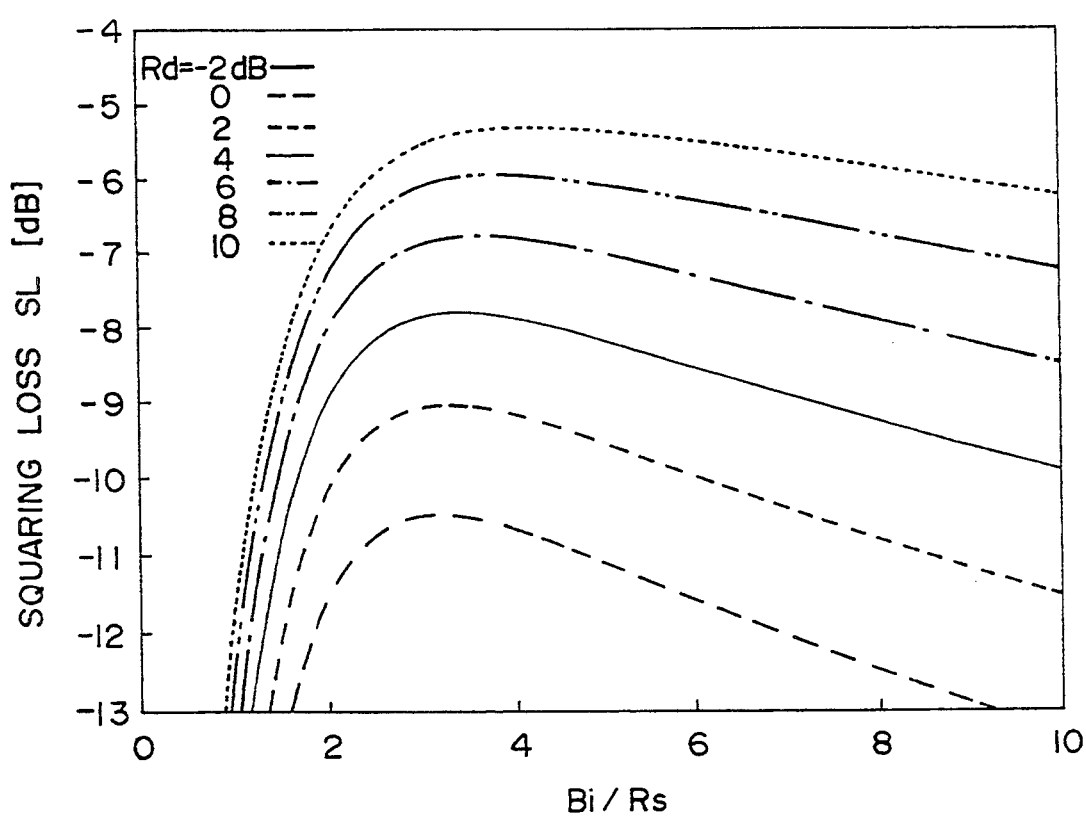
FIG. 28 is a view showing the square loss results when a Manchester code according to the present invention is used.

There is a better characteristic for the larger the square loss $S_L$. For example, FIG. 27 shows the results for calculation of the square loss when a secondary Butterworth filter is assumed for the equal low-region system of the bandpass filter, and when the Dm when the data waveform is the NRZ code and the denominator of equation (30) are calculated and substituted into equation (30). FIG.27 shows the values of the square loss $S_L$ when the bandwidth of the bandpass filter and the ratio $B_i/R_s$ of the data rate are changed. In addition, FIG.27 is a plot for changing the S/N ratio $R_d$ for the bandwidth of the data rate. From the figure, it can be seen that when the NRZ code is used as the data format, practical values for $B_i/R_s$ are from 0.8 to about twice this. In the same manner, FIG. 28 shows the results for the square loss $S_L$ when the Manchester code is used as the data format.

Accordingly, the data rate value of 2~5-fold ables to use. Also, here a secondary Butterworth filter is assumed for the equal equivalence low-region system of the bandpass filter but this characteristic which is good for this range of numerical values is also exhibited for a filter having some other transmission characteristic.

The following effects are produced according to the present invention as has been described above.

(1) A signal which is the product of the correlation output between the received signal, NRZ signal and PN signal, and the correlation output of the received signals and the PN signal of the Manchester code are a control signal for a VCC and can therefore deny information signals and a carrier component. Accordingly, it is possible to obtain an output value corresponding to the phase difference of PN signals, and to feed this value back to the control clock in order to perform synchronizing tracking.

In addition, it is not necessary to have a balance between the two correlators, as was necessary in a conventional DLL, and so it is not necessary to adjust the phase locked loop, this results in advantages in manufacture.

(2) In addition, with a DLL, it was only possible to take a synchronizing PN signal displaced ±½ cycle from the synchronizing loop. but with the present invention, the configuration of the synchronizing loop does not require a time displacement of the PN signals and so it is possible to have perfect synchronizing of the PN signals. This means that a ½ cycle correction circuit and the like is also not required.

(3) Furthermore, with the present invention, it is possible to take reverse-spread signals from the synchronizing loop and so it is not necessary to have a reverse-spread circuit outside the synchronizing loop.

(4) Furthermore, with the present invention, there is a sharp phase tracking characteristic when the phase difference is in the vicinity of 90°, and so it is possible to create a synchronizing loop having a good tracking characteristic.

(5) A signal which is the product of the correlation output between the received signals, and PN signals of the NRZ code, and the correlation output of the received signals and the PN signal of the Manchester code is a control signal for a VCC and so it is possible to perform synchronizing tracking irrespective of the information signals. In addition, it is not necessary to have a balance between the two correlators, as was necessary in a conventional delay locked loop, and so it is not necessary to adjust the phase locked loop, this results in advantages for the cost of manufacture because of this.

(6) The phase synchronizing loop mentioned above in (5) takes the output from the correlator which takes the correlation of the received signals and the PN signal of the NRZ code and so it is possible to obtain a reverse-spread signal which has been converted from the carrier frequency into an intermediate frequency, therefore facilitating latter stage demodulation in the data demodulation portion.

In addition, reverse-spread signals are taken from the phase synchronizing loop and so it is not necessary to newly provide an integrator and a mixer for reverse-spreading, thus making it possible to constitute a low-cost spread spectrum receiver with fewer parts.

(7) The correlation output inside the PN signal synchronizing loop is taken as reverse-spread signals and since there is reference to the signal level thereof, it is not necessary to separately provide a reverse-spread circuit, and it is possible to perform AGC and synchronizing judgment using a simple configuration. This has advantages for the circuit scale, cost, etc.

(8) By reference to a signal which is the sum of the two correlation outputs within the synchronizing loop, fluctuations of the signal level with respect to small phase differences are made practically constant, and it is possible to constitute an AGC circuit and a synchronizing judgment circuit which are highly resistant to jitter in the PN signals.

(9) A signal which is the product of the correlation output between the received signals and PN signal of the NRZ code, and the correlation output of the received signals and the PN signal of the Manchester code is a control signal for a VCC and can therefore deny information signals and a carrier component. In addition, it is possible to obtain an output value which corresponds to the phase difference of the PN signals, and to feed this value back to the control clock and therefore perform synchronizing tracking.

(10) The PN signal of the Manchester cote can now be used in the spread code. In addition, a synchronizing loop which has good tracking characteristics can be made since the phase tracking characteristic is sharp when the phase difference is in the vicinity of 0.

(11) The optimum bandwidth of the bandpass filter is obtained when NRZ code is used as the data format of the data signal, and the optimum bandwidth of the bandpass filter is determined when the Manchester code is used as the data format of the data signal, so that it is possible to realize a synchronizing loop which has good tracking characteristics for PN signals.

Further, the present invention is not limited to the above described embodiments, but various variations and modification may be made without departing from the scope of the inventions.

What is claimed is:

1. A spread spectrum communications system having a PN (pseudo noise) signal synchronizing circuit for synchronizing PN signals in the spread spectrum communications system for a carrier band of an intermediate frequency, said PN signal synchronizing circuit comprising:

a first PN signal generation means for generating a 1-cycle PN signal having the same noise sequence as a noise sequence of a transmission system each clock cycle;

a voltage control clock-signal generation means, for generating clock signals for controlling timing of the generation of said PN signal in said first PN signal generation means;

a first correlator for multiplying said PN signal generated by said first PN signal generation means with a received signal received from said transmission system, so as to obtain a first signal;

a second correlator for multiplying said PN signal generated by said first PN signal generation means with said voltage control clock-signal generated by said voltage control clock-signal generation means so as to obtain second signal;

a first multiplication means for multiplying said first signal output from said first correlator and said second signal output from said second correlator; and a first filter means for filtering a product from said first multiplication means, obtaining a low-frequency component of said product, and for applying said product to said voltage control clock-signal generation means.

2. The spread spectrum communication system as claimed in claim 1, wherein:

said first PN signal generation means generates a PN signal of a non-return to zero (NRZ) code when said transmission system spreads by said PN signal which said transmission system allocates a negative voltage with respect to a logical value of "0" and a positive voltage with respect to a logical value of "1".

3. The spread spectrum communication system as claimed in claim 1, wherein said first PN signal generation means includes:

a first NRZ code PN signal generation means for generating a PN signal of a NRZ code wherein a negative voltage is allocated with respect to a logical value of "0", and a positive value with respect to a logical value of "1" when said clock signal from said voltage control clock-signal generation means is input;

a first Manchester code PN signal generation means for generating a PN signal of a Manchester code a phase of which corresponds to a phase of said PN signal of said NRZ code, and when said first PN signal generation means has said first NRZ code PN signal generation means and said a first Manchester code PN signal generation means, said first correlator correlates by multiplying said received signal and said PN signal of said NRZ code generated by said generation means and abstracting a carrier frequency component from a result of the multiplication, thus obtaining a first signal, and said second correlator correlates by multiplying said received signal and said PN signal of said Manchester code generated by said first Manchester code PN signal generation means and abstracting a carrier frequency component from a product of the multiplication, thus obtaining a second signal.

4. The spread spectrum communications system as claimed in claim 1, wherein:

said first PN signal generation means includes a second NRZ code PN signal generation means for generating a PN signal of said NRZ code wherein a negative voltage is allocated with respect to a logical value of "0", and a positive voltage is allocated with respect to a logical value of "1" when said clock signal from said voltage control clock-signal generation means is input;

a second Manchester code PN signal generation means for generating a PN signal of said Manchester code by calculating a logical exclusive OR of said PN signal of said NRZ code generated by said second NRZ code PN signal generation means and said control clock signal generated by said voltage control clock-signal generation means, and said first correlator correlates by multiplying said received signal and said PN signal of said NRZ code generated by said second NRZ code PN signal generation means thus obtaining a first signal;

said second correlator correlates by multiplying said received signal and said PN signal of said Manchester code generated by said second Manchester code PN signal generation means thus obtaining a second signal.

5. The spread spectrum communications system as claimed in either of claims 3 or 4, wherein:

said first correlator multiplies said received signal with said PN signal of said NRZ code corresponding to a frequency displaced by an intermediate frequency portion from a carrier band frequency, thus obtaining a first signal from which an intermediate frequency component has been abstracted as a result of the multiplication, and said second correlator multiplies said received signal with said PN signal of said Manchester code corresponding to a frequency displaced, by an intermediate frequency portion, from a carrier band frequency, thus obtaining a second signal from which an intermediate frequency component has been abstracted as a result of multiplication.

6. The spread spectrum communications system as claimed in either of claims 3 or 4 wherein said PN signal synchronizing circuit has a first gain control circuit coupled to a pre-stage of said PN signal synchronizing circuit so as to control a gain of input received signals, and said first signal output from said first correlator is input to said first gain control circuit.

7. A spread spectrum communication system as claimed in claim 6, wherein said PN signal synchronizing circuit has demodulation means to which is input said first signal output from said first correlator, and which obtains an information signal from said first signal that has had said PN signal extracted.

8. The spread spectrum communications system as claimed in either of claims 3 or 4, wherein:

said PN signal synchronizing circuit comprises:

a synchronizing judgment means for comparing a predetermined level and output from said first correlator as synchronizing judgment signal, and for judging, as a result of said comparison whether or not synchronization step-out occurs; and an offset generation means for supplying an offset voltage to said voltage control clock-signal generation means when it is judged by said synchronizing judgment means that said output from said first correlator undergoes synchronization step-out.

9. The spread spectrum communications system as claimed in claim 8, wherein said PN signal synchronizing circuit has a demodulation means which is input said first signal from said first correlator, demodulates said first signal, and obtains a information signal without said PN signal.

10. The spread spectrum communications system as claimed in claim 1, wherein said PN signal synchronizing circuit includes a second multiplication means for multiplying said received signal and said PN signal input from said PN signal generation means, and for separating and outputting a product of said received signal and said PN signal, and said first correlator obtains a first signal which abstracted a carrier frequency component from one of said product input from said second multiplication means, and said second correlator multiplies another of said product input from said second multiplication means and said control clock output from said voltage control clock-signal generation means, thus obtains a second signal which is abstracted from a product of said multiplication.

11. The spread spectrum communications system as claimed in claim 10, wherein said first correlator multiplies said received signal and said PN signal generated by said PN signal generation means, and wherein said PN signal corresponds to a frequency displaced from the frequency of the carrier band by an intermediate frequency portion, thus obtaining a first signal from which an intermediate frequency has been abstracted from a result of said multiplication.

12. The spread spectrum communications system as claimed in claim 10, wherein said PN signal synchronizing circuit has a second gain control circuit coupled to a pre-stage of said PN signal synchronizing circuit so as to control a gain of input received signals, and said first signal output from said first correlator is input to said second gain control circuit.

13. The spread spectrum communications system as claimed in claim 12, wherein said PN signal synchronizing circuit has a demodulation means for demodulating an output from said first correlator so as to obtain an information signal which has been extracted said PN signal.

14. The spread spectrum communications system as claimed in claim 10, wherein said PN signal synchronizing circuit comprises;

a synchronizing judgment means for comparing a predetermined level and an output of said first correlator as synchronizing judgment signal, and for judging, as a result of said comparison, whether or not synchronization step-out occurs, and an offset generation means for supplying an offset voltage to said voltage control clock-signal generation means when it is judged by said synchronizing judgment means that said output from said first correlator undergoes synchronization step-out.

15. The spread spectrum communications system as claimed in claim 14, wherein said PN signal synchronizing circuit has a demodulation means for demodulating an output from said first correlator to obtain an information signal which has been extracted said PN signal.

16. The spread spectrum communications system as claimed in claim 1, wherein said PN signal generation means generates Manchester coding when a spread signal of a transmission system is a Manchester code.

17. A spread spectrum communications system having a PN signal synchronizing circuit for PN signal synchronizing in the spread spectrum communications for a carrier band of an intermediate frequency, said PN signal synchronizing circuit comprising:

a PN signal generation means for generating a 1-cycle PN signal having the same noise sequence as a noise sequence of a transmission system for each signal clock cycle;

a voltage control clock-signal generation means for generating control clock signals for control timing for the generation of said PN signal in said PN signal generation means;

a first multiplication means for multiplying said received signal and said clock signal output from said voltage control clock-signal generation means;

a first correlator for multiplying said PN signal generated by said PN signal generation means and said received signal received from transmission system, thus obtaining a first signal;

a second correlator for multiplying a product of said first multiplication means and said PN signal from said PN signal generation means thus obtaining second signal, a second multiplication means for multiplying said first signal output from said first correlator and said second signal output from said second correlator, and a filter means for filtering a low frequency component of an output of said second multiplication means, and for inputting the output of the filter means to said voltage control clock-signal generation means for generating PN signals.

* * * * *